United States Patent
Ahn et al.

(10) Patent No.: US 11,556,182 B2
(45) Date of Patent: Jan. 17, 2023

(54) MOBILE TERMINAL AND CONTROL METHOD THEREFOR

(71) Applicant: LG ELECTRONICS INC., Seoul (KR)

(72) Inventors: Yehan Ahn, Seoul (KR); Minho Kim, Seoul (KR); Hoyoung Kim, Seoul (KR); Mansoo Sin, Seoul (KR)

(73) Assignee: LG ELECTRONICS INC., Seoul (JP)

( * ) Notice: Subject to any disclaimer, the term of this patent is extended or adjusted under 35 U.S.C. 154(b) by 48 days.

(21) Appl. No.: 16/977,449

(22) PCT Filed: Jun. 8, 2018

(86) PCT No.: PCT/KR2018/006526
§ 371 (c)(1),
(2) Date: Sep. 1, 2020

(87) PCT Pub. No.: WO2019/168238
PCT Pub. Date: Sep. 6, 2019

(65) Prior Publication Data
US 2020/0401231 A1 Dec. 24, 2020

(30) Foreign Application Priority Data
Mar. 2, 2018 (KR) .................. 10-2018-0025267

(51) Int. Cl.
*G06F 3/01* (2006.01)
*G06T 7/50* (2017.01)
(Continued)

(52) U.S. Cl.
CPC .............. *G06F 3/017* (2013.01); *G06F 3/011* (2013.01); *G06F 3/0304* (2013.01); *G06T 7/11* (2017.01);
(Continued)

(58) Field of Classification Search
CPC ........ G06F 3/017; G06F 3/0304; G06F 3/011; G06T 7/11; G06T 7/50;
(Continued)

(56) References Cited

U.S. PATENT DOCUMENTS

2012/0113223 A1  5/2012 Hilliges et al.
2012/0326995 A1* 12/2012 Zhang .................... G06V 40/28
345/173

(Continued)

FOREIGN PATENT DOCUMENTS

KR      101426378       8/2014
KR    1020150076574      7/2015
(Continued)

OTHER PUBLICATIONS

European Patent Office Application Serial No. 18907814.0, Search Report dated Nov. 4, 2021, 9 pages.

(Continued)

*Primary Examiner* — Nay A Maung
*Assistant Examiner* — Daniella M. DiGuglielmo
(74) *Attorney, Agent, or Firm* — Lee, Hong, Degerman, Kang & Waimey PC

(57) ABSTRACT

The present invention relates to a device and a control method therefor and, more specifically, the device comprises: a memory for storing at least one command; a depth camera for capturing at least one hand of a user; a display module; and a controller for controlling the memory, the depth camera, and the display module. The controller controls the depth camera so as to capture the at least one hand of a user and controls the display module so as to output a visual feedback that changes on the basis of the captured hand of a user.

9 Claims, 27 Drawing Sheets

(51) Int. Cl.
- *G06T 7/11* (2017.01)
- *G06F 3/03* (2006.01)
- *G06V 40/20* (2022.01)
- *G06V 40/60* (2022.01)
- *G06V 40/10* (2022.01)
- *G06T 7/194* (2017.01)
- *G06T 7/73* (2017.01)
- *H04M 1/725* (2021.01)
- *H04M 1/72403* (2021.01)

(52) U.S. Cl.
CPC ............... *G06T 7/194* (2017.01); *G06T 7/50* (2017.01); *G06T 7/73* (2017.01); *G06V 40/107* (2022.01); *G06V 40/28* (2022.01); *G06V 40/67* (2022.01); *G06T 2200/16* (2013.01); *G06T 2200/24* (2013.01); *G06T 2207/10028* (2013.01); *G06T 2207/20021* (2013.01); *H04M 1/725* (2013.01); *H04M 1/72403* (2021.01); *H04M 2201/38* (2013.01); *H04M 2250/52* (2013.01)

(58) Field of Classification Search
CPC . G06T 2207/10028; G06T 2207/20021; G06T 2200/16; G06T 2200/24; G06T 7/194; G06T 7/73; G06V 40/107; G06V 40/28; G06V 40/67; H04M 1/725; H04M 1/72403; H04M 2201/34; H04M 2201/36; H04M 2201/38; H04M 2250/52

See application file for complete search history.

(56) References Cited

U.S. PATENT DOCUMENTS

| | | | |
|---|---|---|---|
| 2014/0258942 A1* | 9/2014 | Kutliroff | G06F 3/013 715/863 |
| 2015/0153951 A1* | 6/2015 | Kim | G06F 3/0445 715/773 |
| 2016/0127713 A1 | 5/2016 | Hazeghi | |
| 2017/0024015 A1 | 1/2017 | Song et al. | |
| 2017/0186167 A1* | 6/2017 | Grunnet-Jepsen | H04N 13/239 |
| 2017/0364198 A1* | 12/2017 | Yoganandan | G06F 3/04815 |

FOREIGN PATENT DOCUMENTS

| | | |
|---|---|---|
| KR | 1020160031183 | 3/2016 |
| KR | 1020170037585 | 4/2017 |

OTHER PUBLICATIONS

PCT International Application No. PCT/KR2018/006526, Notification of Transmittal of the International Search Report and the Written Opinion of the International Searching Authority, or Declaration dated Nov. 30, 2018, 10 pages.

* cited by examiner

FIG. 12

| 0 | 0 | 0   | 0   | 0   | 0 | 0 |
|---|---|-----|-----|-----|---|---|
| 0 | 0 | 122 | 112 | 132 | 0 | 0 |
| 0 | 112 | 75 | 98 | 11 | 0 | 0 |
| 0 | 142 | 85 | 97 | 13 | 0 | 0 |
| 0 | 111 | 95 | 121 | 0 | 0 | 0 |
| 0 | 134 | 89 | 115 | 0 | 0 | 0 |
| 0 | 0 | 116 | 0 | 0 | 0 | 0 |

[501] min distance (value of a pixel closest to a camera)
[502] OFFSET_A (fingertip, about 1 cm)
[503] OFFSET_B (fingertip, length of two knuckles)
[504] OFFSET_C (length from fingertip to hand)

[601] image-C
[602] image-B
[603] region-C
[604] region-B

[801] center point of region-A
[802] center point of region-B (a) [602]
(b) [602]

[701] image-A
[702] region-A
[703] center point of region-C
[704] correction point

[711] dx of correction point
[712] dx of center point of region-C
[713] dy of correction point
[714] dy of center point of region-C

[801] center point of region-A
[802] center point of region-B

[1201] Target Object
[1202] Target Region

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2018/006526, filed on Jun. 8, 2018, which claims the benefit of earlier filing date and right of priority to Korean Application No. 10-2018-0025267, filed on Mar. 2, 2018, the contents of which are all incorporated by reference herein in their entireties.

TECHNICAL FIELD

The present disclosure relates to a mobile terminal and control method thereof. More particularly, the present disclosure is applicable to a technical field for detecting a user's intention to control the corresponding mobile terminal using a depth camera with a more accurate and faster algorithm.

BACKGROUND ART

Terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

Meanwhile, devices with artificial intelligence capabilities are being discussed in various fields. A basic feature of these artificial intelligence devices is that they exist in stand states to interact with users. However, if a touch interface is used in stand state, there is a problem that a user should access the device every time. If a physical contact (e.g., a touch) is made with the device, there are limitations that a position of the device may change or that the device may fall. Voice recognition may be considered as another interface to solve this problem, but so far there is a problem with recognition rate performance.

BRIEF SUMMARY OF THE INVENTION

Technical Task

The present disclosure is intended to solve the above problem and other problems through the specification of the present disclosure.

A technical task of one embodiment of the present disclosure is to implement a vision-based UI using a depth camera rather than touch or voice recognition. In particular, in order to reduce an image processing time, an image of a part corresponding to a user's hand should be quickly and accurately extracted from an image acquired by the depth camera, for which a depth value (ex: Z-axis distance) of the image is used. When a user uses a vision-based UI, it can be assumed that a camera and a hand are closer to each other in comparison to other body. In this case, a background or other bodies that are farther than a random distance can be ignored through depth values, so only an image of the hand can be extracted quickly.

A technical task of another embodiment of the present disclosure is to accurately measure a direction that a finger points in and a distance between a device and the finger. To this end, it is intended to accurately measure a user and a point indicated by the finger and a fingertip and a hand image should be separated on the basis of a distance. Thus, a solution for accurately detecting a distance between the fingertip and the device is provided.

Technical Solutions

In one technical aspect of the present disclosure, provided herein is a method of controlling a device including a depth camera according to one embodiment of the present disclosure, the method including acquiring a depth image using the depth camera, changing the device from a first state into a second state by analyzing the acquired depth image with reference to a memory, determining whether a user's finger points to the device with reference to the memory, changing the device from the second state into a third state if determining that that the user's finger points to the device, tracking an end point of the user's finger, and displaying a target point having a position changed in response to the tracked end point of the user's finger.

In another technical aspect of the present disclosure, provided herein is a device including a depth camera according to one embodiment of the present disclosure, the device including a memory storing one or more commands, a depth camera capturing at least one user's hand, a display module, and a controller configured to control the memory, the depth camera and the display module. The controller is further configured to control the depth camera to capture the at least one user's hand and control the display module to output a visual feedback changed based on the captured user's hand.

Advantageous Effects

Effects of a mobile terminal and control method thereof according to the present disclosure are described as follows.

According to at least one of embodiments of the present disclosure, a new solution for interaction between a user and a device through a target point indicated by a user with a finger is provided.

According to at least one of embodiments of the present disclosure, a method of detecting a target point more accurately is defined in detail.

According to at least one of embodiments of the present disclosure, visual feedback for enabling a user to recognize a target point more easily and conveniently is provided.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

DESCRIPTION OF DRAWINGS

FIG. 12 shows data required for implementing a step S1110 shown in FIG. 11.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with or to" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, Personal Digital Assistants (PDAs), Portable Multimedia Players (PMPs), navigators, slate PCs, tablet PCs, ultra books, wearable devices (for example, smart watches, smart glasses, Head Mounted Displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1A:
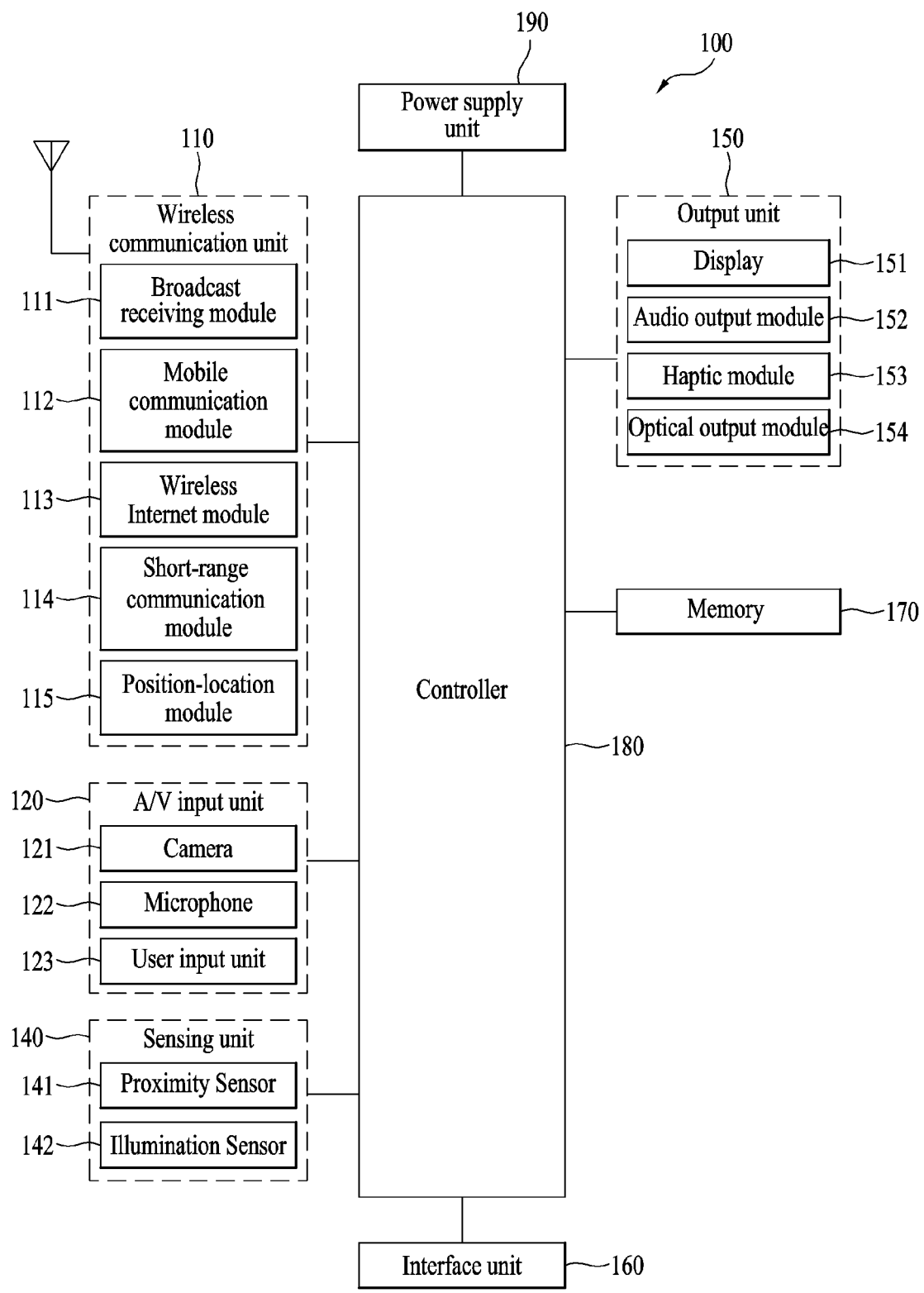
FIG. 1A is a block diagram to describe a mobile terminal related to the present disclosure.
Figure 1B:
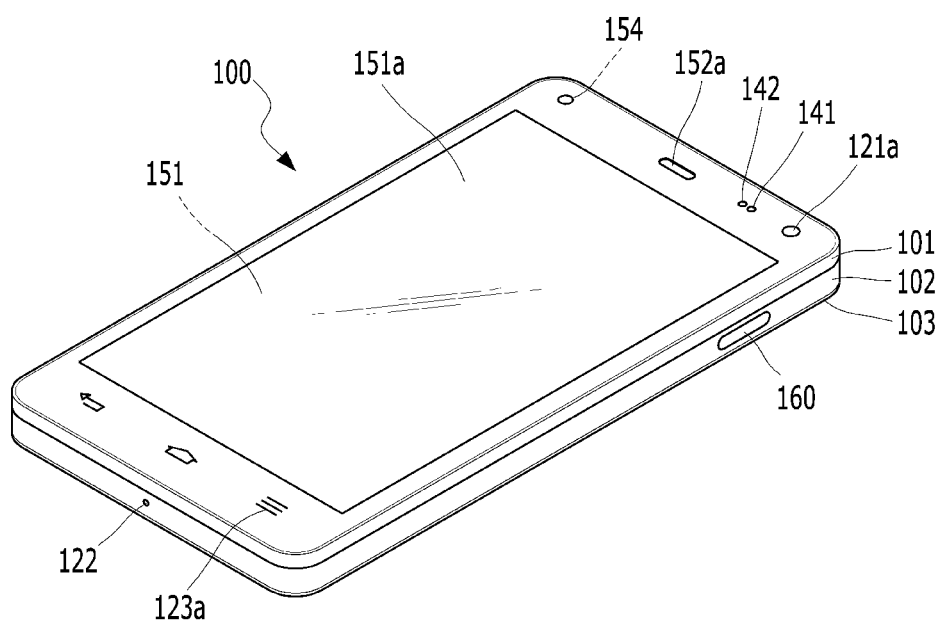
FIG. 1B and FIG. 1C are conceptual diagrams for one example of a mobile terminal related to the present disclosure, viewed in different directions.
Figure 1C:
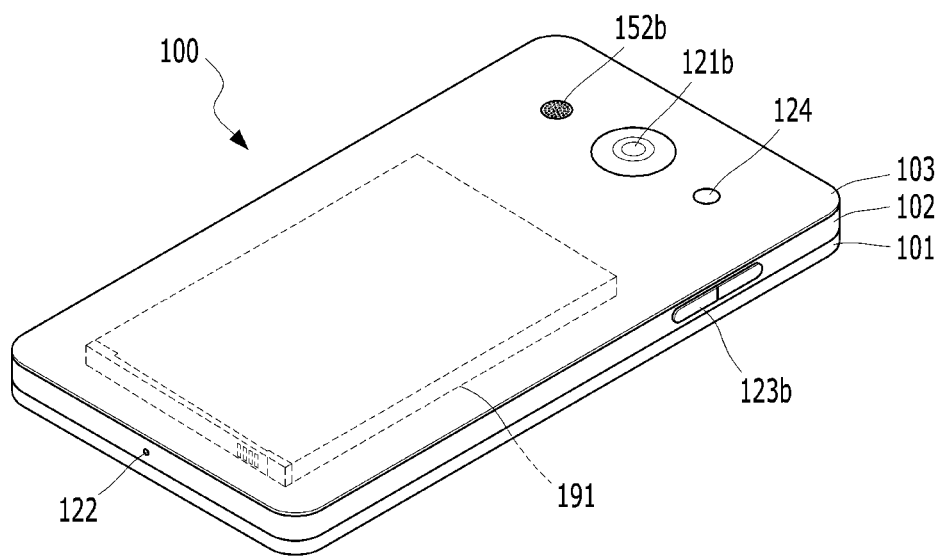

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a position location module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like.

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The position-location module 115 is generally configured to detect, calculate, derive or otherwise identify a position of the mobile terminal. As an example, the position-location module 115 includes a Global Position System (GPS) module, a Wi-Fi module, or both. If desired, the position-location module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100.

The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 can receive external power or provide internal power and supply the appropriate power required for operating respective elements and components included in the mobile terminal 100. The power supply unit 190 may include a battery, which is typically rechargeable or be detachably coupled to the terminal body for charging.

Also, the power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Also, various embodiments can be implemented in the computer and similar recording materials using software, hardware and the combination of software and hardware.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

In the figure, the first operation unit 123a is a touch key, the invention is not limited thereto. For example, the first operation unit 123a a mechanical key, or a combination of a touch key and a touch key.

The contents input by the first and second operation units 123a and 123b are variously set. For example, the first operation unit 123a may issue a command such as a menu, a home key, a cancel, and the second operation unit 123b receives the first sound output from the first or second sound output unit 152a or 152b the size of the sound to be output, and the switch to the touch recognition mode of the display unit 151 can be input.

The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, in the present invention, it can be displayed using a flexible display. In the following, this will be discussed in more detail with attached drawings.

Figure 2:
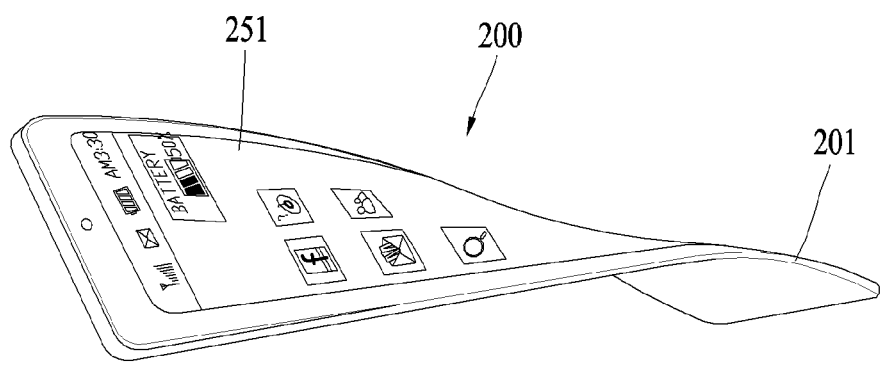
FIG. 2 is a conceptual diagram to describe another example of a deformable mobile terminal according to the present disclosure.

FIG. 2 is a conceptual view to describe another example of a deformable mobile terminal 200 according to the present invention.

Referring to FIG. 2, a display unit 251 may be configured deformable in response to an external force. This deformation may include at last one of curving, bending, folding, twisting, rolling, and combinations thereof. The deformable display unit 251 may be named "flexible display unit". In particular, the flexible display unit 251 may include a general flexible display, an electronic paper (also known as e-paper), and a combination thereof. In general, a mobile terminal 200 may be configured to include the same or similar features of the former mobile terminal 100 shown in FIGS. 1A to 1C.

Generally, a flexible display means a display that is light-weighted and non-fragile in a manner of being fabricated on a thin and flexible substrate having such properties of paper as curving, bending, folding, twisting, and rolling while maintaining the properties of an existing flat panel display.

The e-paper may be used to refer to a display technology that employs the properties of a general ink. The e-paper is different from the existing flat panel display in using reflective light. The e-paper is generally understood as changing displayed information by electrophoresis using twist balls or capsules.

In a state that the flexible display unit 251 is not deformed (for example, a state that the flexible display unit 251 has an infinite radius of curvature, referred to as a $1^{st}$ state), a display region of the flexible display unit 251 becomes a flat surface. In a state that the flexible display unit 251 is deformed from the $1^{st}$ state by an external force (for example, a state that the flexible display unit 251 has a finite radius of curvature, referred to as a $2^{nd}$ state), the display region may become a curved surface or a bent surface. As illustrated, information displayed in the second state may include a visual information outputted through the curved surface. The visual information may be implemented in a manner that light emission of each unit pixel (sub-pixel) arranged in a matrix configuration is controlled independently. In this case, the unit pixel denotes an elementary unit for representing a single color.

The flexible display unit 251 may enter not a flat state but a curved state (for example, a vertically curved state, a horizontally curved state, etc.) in the $1^{st}$ state. In doing so, if an external force is applied to the flexible display unit 251, the flexible display unit 251 may be deformed into a flat state (or a less curved state) or a more curved state.

If desired, the flexible display unit 251 may embody a flexible touchscreen by being combined with a touch sensor. If a touch is applied to the flexible touchscreen, the controller 180 (cf. FIG. 1A) can perform a control in response to the touch input. The flexible touchscreen may be configured to sense a touch input not only in the $1^{st}$ state but also in the $2^{nd}$ state.

Meanwhile, the mobile terminal 200 according to the modified example may include a deformation sensing means for sensing the deformation of the flexible display unit 251. The deformation sensing means may be included in the sensing unit 140 shown in FIG. 1A.

The deformation sensing means is provided to the flexible display unit 251 or the case 201 to sense information related to the deformation of the flexible display unit 251. Examples of such information related to the deformation of the flexible display unit 251 may include a deformed direction of the flexible display unit 251, a deformed degree of the flexible display unit 251, a deformed position of the flexible display unit 251, a deformed time of the flexible display unit 251, an acceleration for restoring the deformed flexible display unit 251, and the like. Besides, the information may include various kinds of information that can be sensed owing to the curving of the flexible display unit 251.

The controller 180 can change the information displayed on the flexible display unit 251 or generate a control signal for controlling a function of the mobile terminal 200, based on the information related to the deformation of the flexible display unit 251. Such information is typically sensed by the deformation sensing means.

The mobile terminal 200 according to the modified example may include a case 201 for accommodating the flexible display unit 251. The case 201 can be configured deformable together with the flexible display unit 251 in consideration of the property of the flexible display unit 251.

A battery (not shown in the drawing) provided to the mobile terminal 200 may be configured deformable by an external force together with the flexible display unit 251 in consideration of the property of the flexible display unit 251. In order to embody such a battery, it is able to employ a stack and folding scheme of stacking battery cells on each other.

The state deformation of the flexible display unit 251 is non-limited by the case of applying the external force. For example, the flexible display unit 251 can be deformed into the $2^{nd}$ state in response a command given by a user or application when the flexible display unit 251 is in the $1^{st}$ state.

Hereinafter, embodiments related to a control method that can be implemented in a mobile terminal configured as described above will be described with reference to the accompanying drawings. It is obvious to those skilled in the art that the present invention can be embodied in other specific forms without departing from the spirit and essential features of the present invention.

Figure 3:
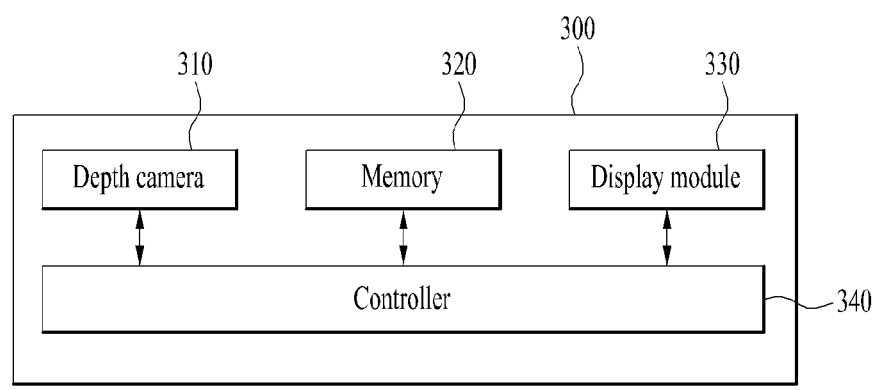
FIG. 3 is a block diagram including main blocks of a device according to one embodiment of the present disclosure.

FIG. 3 is a block diagram including main blocks of a device according to one embodiment of the present disclosure. A device 300 shown in FIG. 3 may include the mobile terminal shown in FIG. 1 and FIG. 2 or one of a mobile device, a tablet, a laptop, a notebook, a signage, a TV and a display device of any type, equipped with a depth camera.

The device shown in FIG. 3 includes a depth camera 310, a memory 320, a display module 330, and a controller 340. In the memory 320, data capable of executing steps of a flowchart described later in the following drawings may be included selectively or all.

According to one embodiment of the present disclosure, there are three kinds of methods for extracting a depth value. Firstly, there is a ToF method (ToF Camera), which is a method of finding a distance of each pixel through a time taken for light to return after being reflected by an object. Secondly, there is a structured IR method (Structured IR Camera), which is a method of finding a distance of each pixel by finding a distortion extend of a projected pattern. Thirdly, there is a stereo method (Stereo Camera), which is a method of finding a distance of each pixel using binocular disparity. This is possible through the depth camera 310 shown in FIG. 3.

In summary, the memory 320 stores at least one command and the depth camera 310 captures at least one user's hand.

The controller 340 controls the memory 320, the depth camera 310 and the display module 330. Particularly, the controller 340 captures the at least one user's hand by controlling the depth camera 310 and outputs a visual feedback, which is changed by the captured user's hand, by controlling the display module 330.

The visual feedback includes a type of mirroring the captured user's hand for example and distinctively displays an end point of a finger located in a distance closest to the device 300. This will be described in detail with reference to FIG. 6, FIG. 24, etc.

If determining that the captured user's hand is located between a minimum reference distance and a maximum reference distance from the device, the controller 340 outputs the visual feedback. This will be described in detail with reference to FIG. 8, etc.

The controller 340 is designed to change a position of a target point outputted to the display module 330 based on the end point of the finger located in the closest distance from the device 300 and a reference point of the captured user's hand. This will be described in detail with reference to FIGS. 14 to 19, etc.

Figure 4:
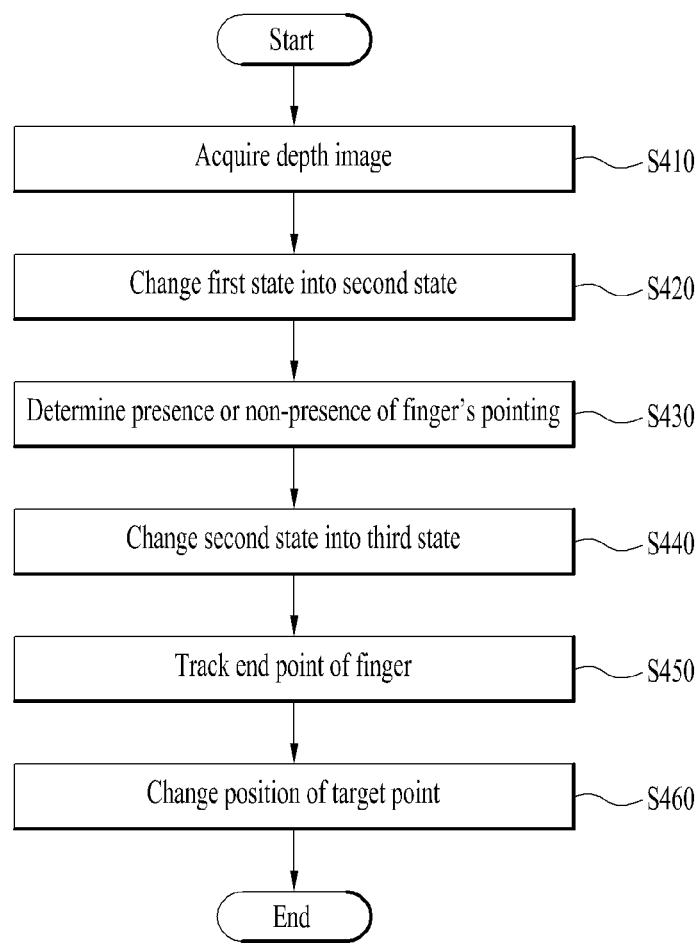
FIG. 4 is a flowchart showing a method of controlling a device according to one embodiment of the present disclosure.

FIG. 4 is a flowchart showing a method of controlling a device according to one embodiment of the present disclosure. Other embodiments may be implemented through the embodiments of FIG. 4 and FIG. 3 by those skilled in the art.

A device including a depth camera according to one embodiment of the present disclosure acquires a depth image using the depth camera [S410] and changes a state of the device from a first state into a second state by analyzing the acquired depth image by referring to a memory [S420]. Here, the first state corresponds to a not-ready state shown in FIG. 7 and the second state corresponds to a ready state shown in FIG. 7.

Furthermore, it is determined whether a user's finger points to the device by referring to the memory [S430]. If the user's finger is determined as pointing to the device, the state of the device is changed from the second state into a third state [S440]. Here, the second state corresponds to the ready state shown in FIG. 7 and the third state corresponds to an active state shown in FIG. 7.

An end point of the user's finger is tracked [S450], and a target point of which position is changed according to the tracked end point of the user's finger is displayed [S460].

The step S420 of changing from the first state into the second state includes a step of removing values of pixels failing to exist between a minimum reference distance and a maximum reference distance by comparing each pixel value of the depth image, a step of estimating pixels, of which top, bottom, right and left sides are attached among unremoved pixels, as one segment, a step of regarding a segment having the biggest pixel number as valid only if a plurality of segments exist, and a step of changing into a second state corresponding to a ready state if the pixel number of the regarded segment is equal to or greater than a preset threshold value. This will be described in detail with reference to FIG. 9, etc.

The determining step S430 is designed to estimate a smallest value among the pixel values in the regarded segment as a pixel value closest to the device. This will be described in detail with reference to FIG. 12, etc.

The determining step S430 includes a step of determining a first image including pixels located from a point estimated as the pixel value closest to the device to a first distance, a step of determining a second image including pixels located from the point estimated as the pixel value closest to the device to a second distance, and a step of determining a third image including pixels located from the point estimated as the pixel value closest to the device to a third distance, and is characterized in that the second distance is greater than the first distance and that the third distance is greater than the second distance. This will be described in detail with reference to FIG. 8, etc.

Furthermore, although not shown in FIG. 4, if the segment number of the second image is 1, a size of the second image is smaller than a predetermined ratio of the third image, and a distance between a center point of the first image and a center point of the second image is smaller than the estimated pixel value closest to the device, a step of determining that the user's finger points to the device is further included, which falls within the scope of the present disclosure. This will be described in detail with reference to FIG. 14, FIG. 15, etc.

The displaying step S460 is characterized in changing a position of the target point based on a center point of a specific region of the acquired depth image and a fixed correction ratio. This will be described in detail with reference to FIGS. 16 to 19, etc.

Figure 5:
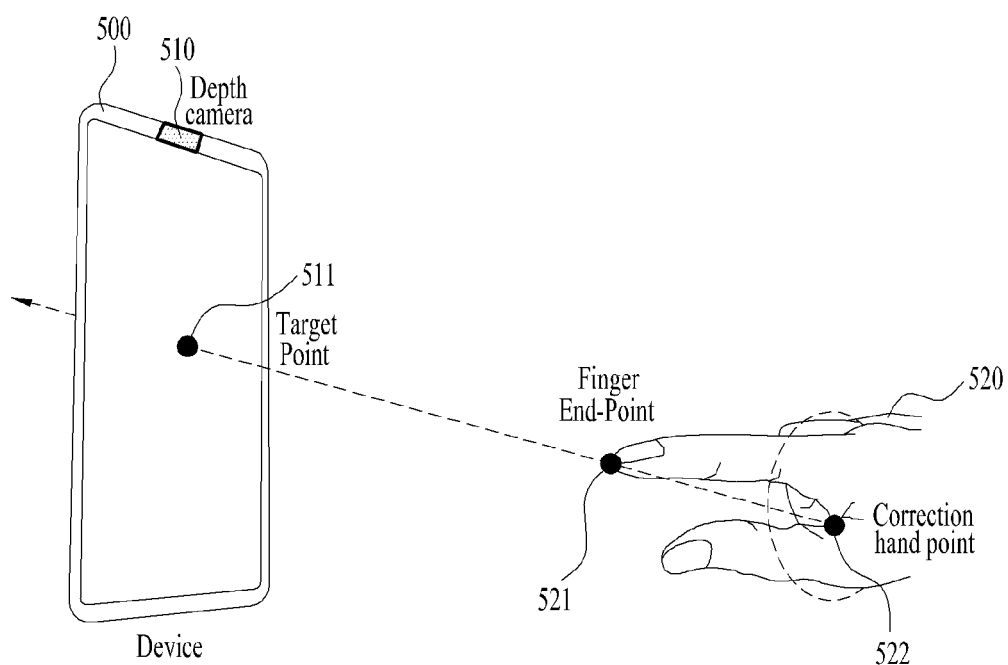
FIG. 5 is a diagram to schematically describe a visual UI between a device and a user according to one embodiment of the present disclosure.

FIG. 5 is a diagram to schematically describe a visual UI between a device and a user according to one embodiment of the present disclosure.

A device 500 according to one embodiment of the present disclosure includes a depth camera 510, and moves a target point 511 according to a direction directed by an end point 521 of a finger of a user 520. For more accurate detection, a corrected center point 522 of a hand is designed to be calculated automatically. The corrected center point 522 of the hand is calculated each pointing or the once-found corrected center point 522 of the hand continues to be used, which falls within the scope of the present disclosure.

Figure 6:
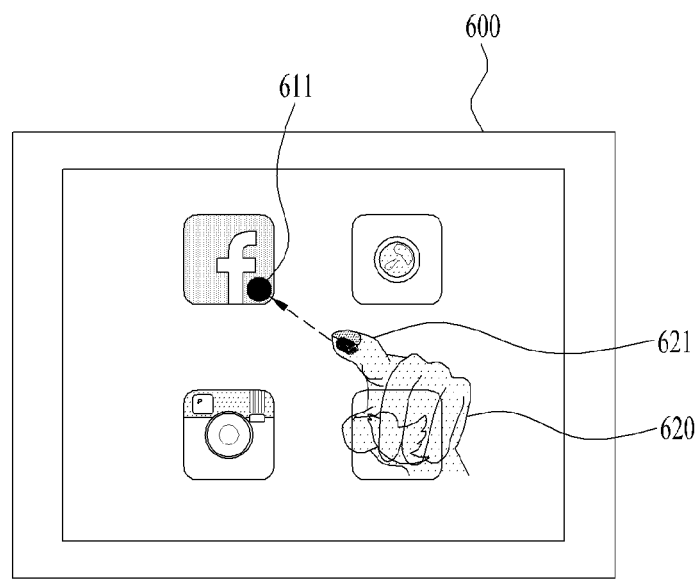
FIG. 6 is a diagram showing the visual UI of FIG. 5 in detail.

FIG. 6 is a diagram showing the visual UI of FIG. 5 in detail. As shown in FIG. 6, an overall shape of a hand captured by a depth camera of a device 600 is outputted as a mirroring shape 620 and a finger end point 621, which is closest between a user and the device 600 and becomes a reference of pointing, is displayed in a manner of being further emphasized. And, it is designed that a position of a cursor 611 is moved in a manner of being linked to a motion of the finger end point 621.

In summary, the present disclosure proposes a new method of enabling interaction between a user and a device through a target point indicated by a user with a finger. Here, when a user points with a finger at a display of a device, the indicated point means a point at which a straight line indicated by the finger and the display of the device meet together. The present disclosure includes a technology of recognizing a user's intention to use a pointing UI through a position and shape of a hand and a technology of finding coordinates of a target point through corrected coordinates of a finger end point and the hand. Through this, a state is separated according to user's intention and an operation and visual effect appropriate for each state are then defined. Furthermore, a method of controlling a target object through a target point is defined. First of all, a pointing UI proposed by the present disclosure is defined as one of three kinds of states. This is described in detail with reference to FIG. 7 and FIG. 8 as follows.

Figure 7:
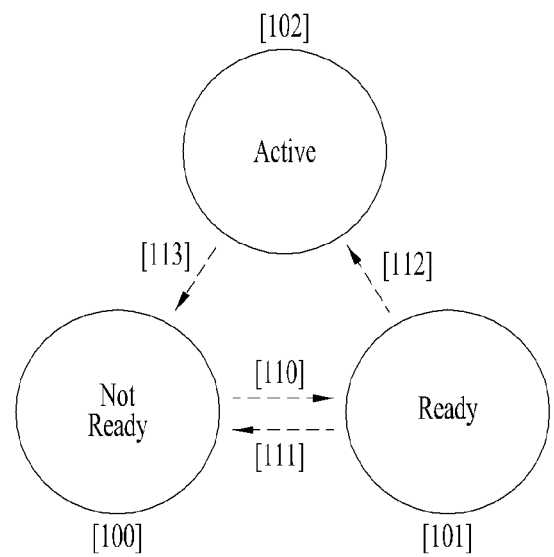
FIG. 7 is a diagram showing a changed state of a device according to one embodiment of the present disclosure.
Figure 8:
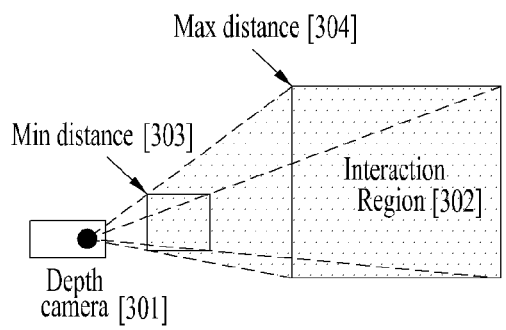
FIG. 8 is a diagram to describe a reference for changing the state shown in FIG. 7.

FIG. 7 is a diagram showing a changed state of a device according to one embodiment of the present disclosure. FIG. 8 is a diagram to describe a reference for changing the state shown in FIG. 7.

A not-ready state 100 shown in FIG. 7 means a state that a valid segment does not exist within an interaction region 302 shown in FIG. 8. The interaction region 302 means a case that a user's hand is located between a minimum distance 303 and a maximum distance 304 from a depth camera 301.

A ready state 101 shown in FIG. 7 means that a valid segment exists within the interaction region 302 shown in FIG. 8. A segment image acquired by the depth camera is processed (e.g., normalized) and then outputted through a display of a device. Thus, it is advantageous in that a user can easily recognize that the device enters a ready state now and whether a hand is located at a prescribed position within a Field Of View (FOV).

Finally, an active state 102 shown in FIG. 7 is a state of determining that a user points with a finger at a prescribed region of the display of the device. From this moment, algorithm for finding a target point operates, thereby bringing a technical effect of reducing unnecessary data processing.

Meanwhile, the state change is described in detail as follows.

Once a user's hand is recognized within an interaction region, a not-ready state is changed into a ready state. If the user's hand leaves the interaction region, the ready state is changed into the not-ready state again.

In addition, if the user's hand exists within the interaction region and a finger or the like is recognized as pointing to the display of the device, the ready state is changed into an active state. On the other hand, if the user's hand leaves the interaction region, it is changed into the not-ready state again.

Figure 9:
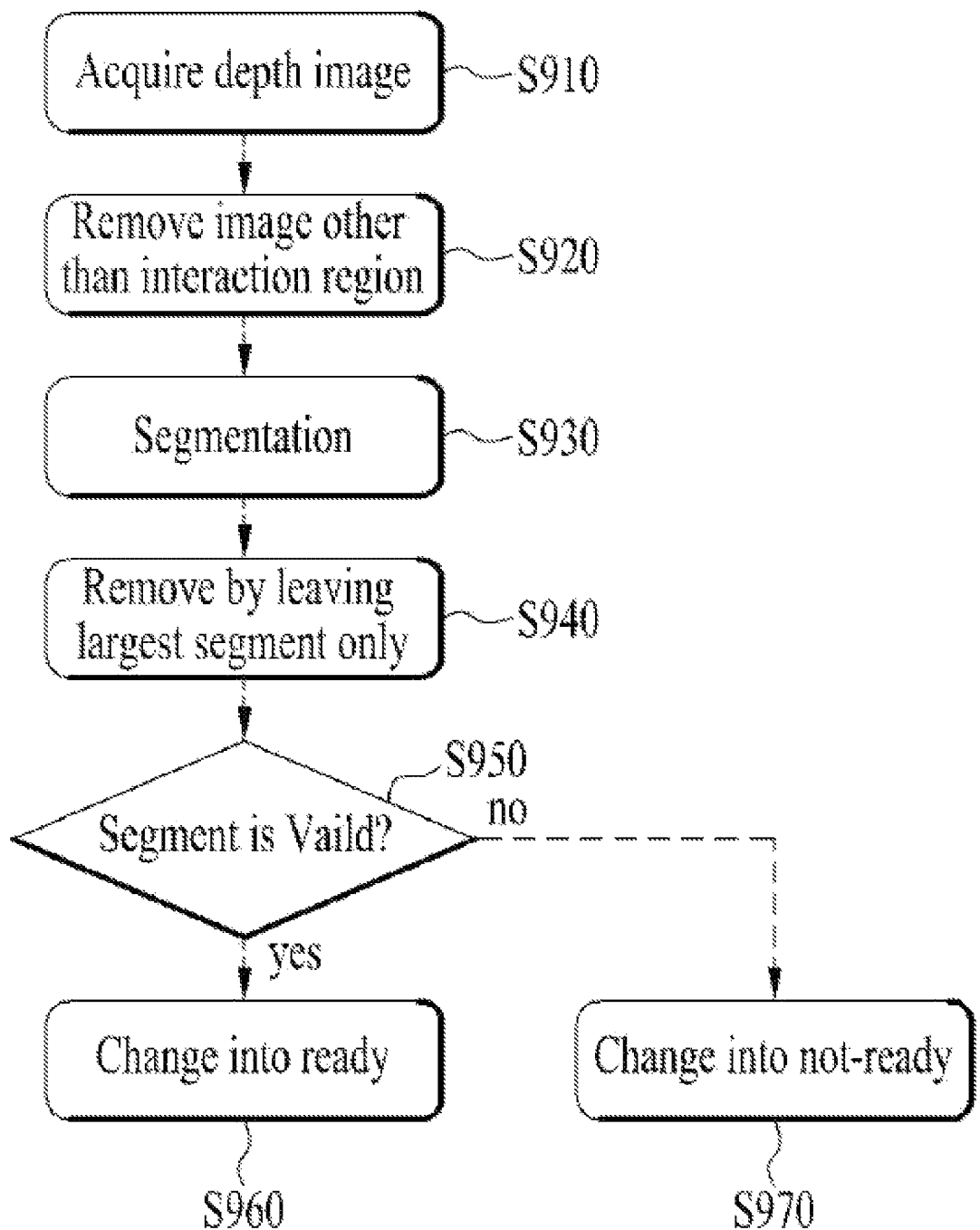
FIG. 9 is a flowchart showing a process for switching a not-ready state and a ready state shown in FIG. 7.

FIG. 9 is a flowchart showing a process for switching between a not-ready state and a ready state shown in FIG. 7.

A depth camera of a device according to one embodiment of the present disclosure acquires a depth image [S910]. After comparison of each pixel value of the depth image, values of pixels closer that a minimum distance or farther than a maximum distance are removed [S920].

Moreover, the remaining pixels are segmented [S930]. Namely, pixels having top, bottom, right and left sides are attached are regarded as a single segment.

Yet, if several segments exist, the segment having the biggest pixel number is left and values of the pixels of the rest of the segments are removed [S940].

It is determined whether the biggest pixel number of the segment is greater than a preset value (COUNT_THRESH-OLD) [S950]. The preset value may be set or changed based on a size of a hand.

If the pixel number is greater than the preset value (COUNT_THRESHOLD) (e.g., a hand size), the state is changed into 'ready' [S960]. If the pixel number is smaller than the preset value (COUNT_THRESHOLD), the state is changed into 'not ready' [S970].

Figure 10:
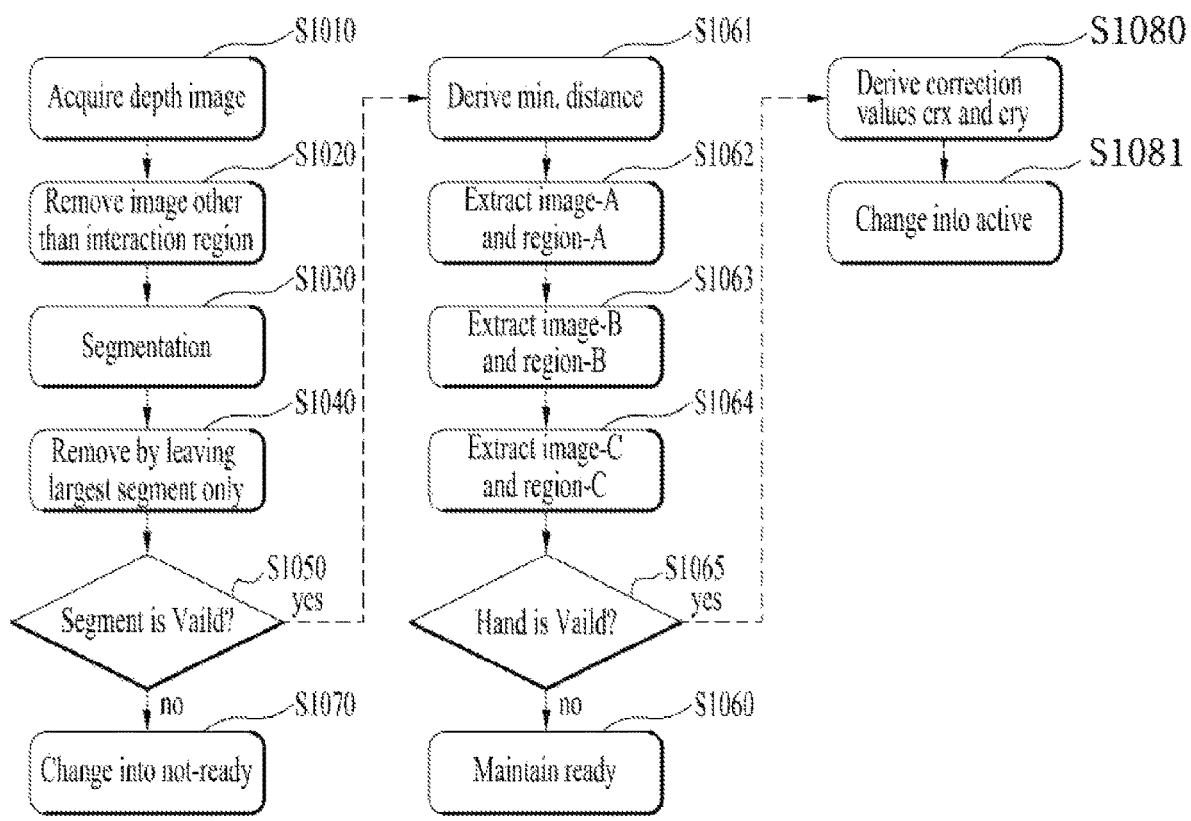
FIG. 10 is a flowchart showing a process for switching a ready state and an active state shown in FIG. 7.

FIG. 10 is a flowchart showing a process for switching a ready state between an active state shown in FIG. 7.

Steps S1010 to S1080 shown in FIG. 10 are identically described in FIG. 9 and redundant description will be omitted. Compared to FIG. 9, FIG. 10 shows a process for changing into a ready state in detail.

If the pixel number schematically described in FIG. 9 is greater than a preset value (COUNT_THRESHOLD) (e.g., a hand size), the step S960 of changing a state into ready will be described in detail with reference to FIG. 10.

As shown in FIG. 10, a minimum distance is derived by deriving a smallest value from pixel values within a segment [S1061]. The minimum distance means a value of a pixel closest to a camera. The step S1061 will be described in detail with reference to FIG. 11 and FIG. 12.

Subsequently, images A, B and C are extracted from the segment [S1062, S1063, S1064], which will be described in detail with reference to FIG. 13.

Subsequently, through the steps S1062 to S1064, it is determined whether a hand before a device is valid data [S1065]. If not valid as a result of the determination, a ready state is maintained without being changed into an active state [S1060]. If valid as a result of the determination, it is changed into the active state through a step S1080. The aforementioned steps S1065 and S1060 will be described in detail with reference to FIG. 14 and FIG. 15, and the aforementioned steps S1080 and S1081 will be described in detail with reference to FIG. 16 and FIG. 17.

Figure 11:
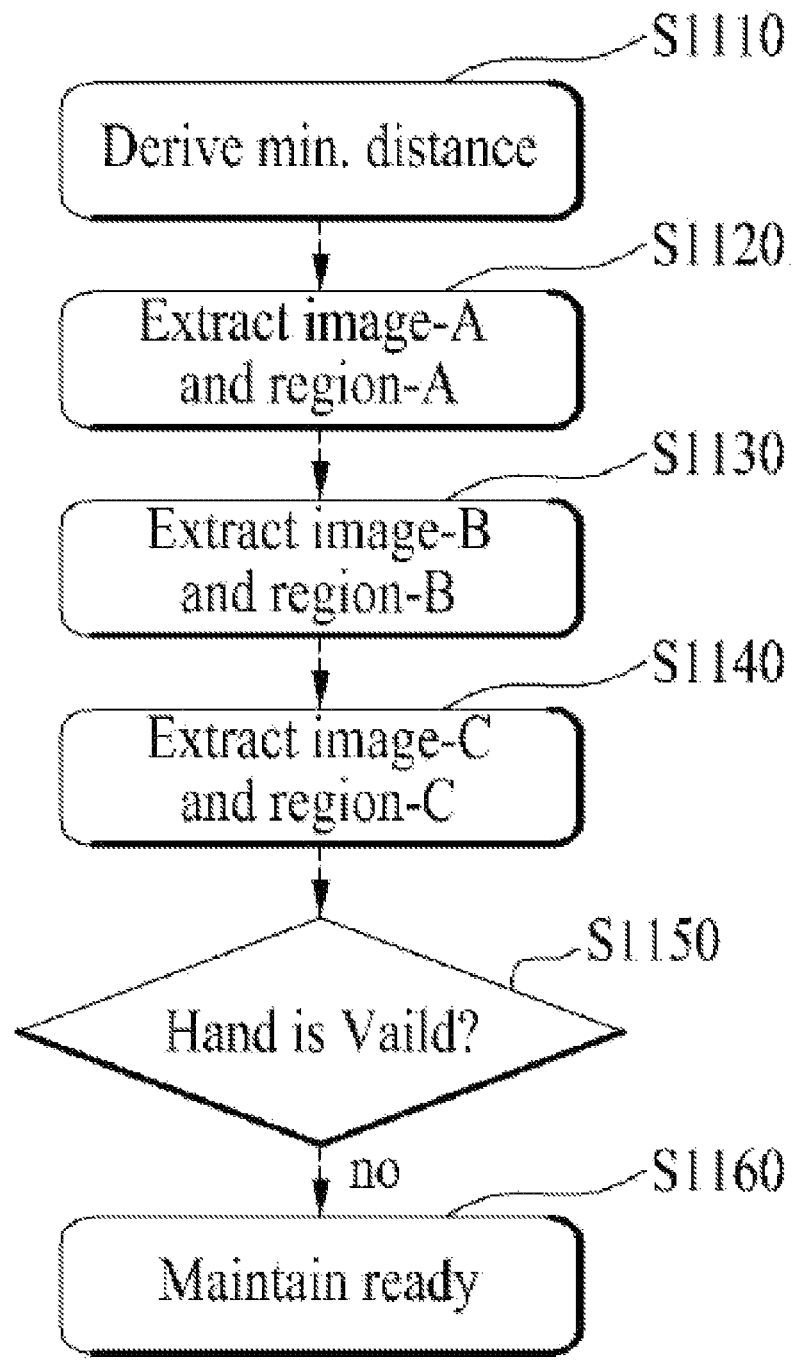
FIG. 11 is a flowchart showing steps S1110 to S1160 shown in FIG. 10.

FIG. 11 is a flowchart showing the steps S1110 to S1160 shown in FIG. 10. FIG. 12 shows data required for implementing the step S1110 shown in FIG. 11.

As steps S1120 to S160 shown in FIG. 11 are identical to FIG. 10, the step S1110 shown in FIG. 11 will be described in detail with reference to FIG. 12.

FIG. 12 shows each pixel value of a depth image. Each pixel value indicates a distance from a depth camera of a device to each pixel.

Therefore, if the smallest value is derived from pixel values within an acquired segment, a minimum distance (i.e., a size of a pixel value closest to a camera) can be found. In the embodiment of FIG. 12, the minimum distance corresponds to '75' of a smallest pixel value within a segment having a valid pixel value (not zero).

Figure 13:
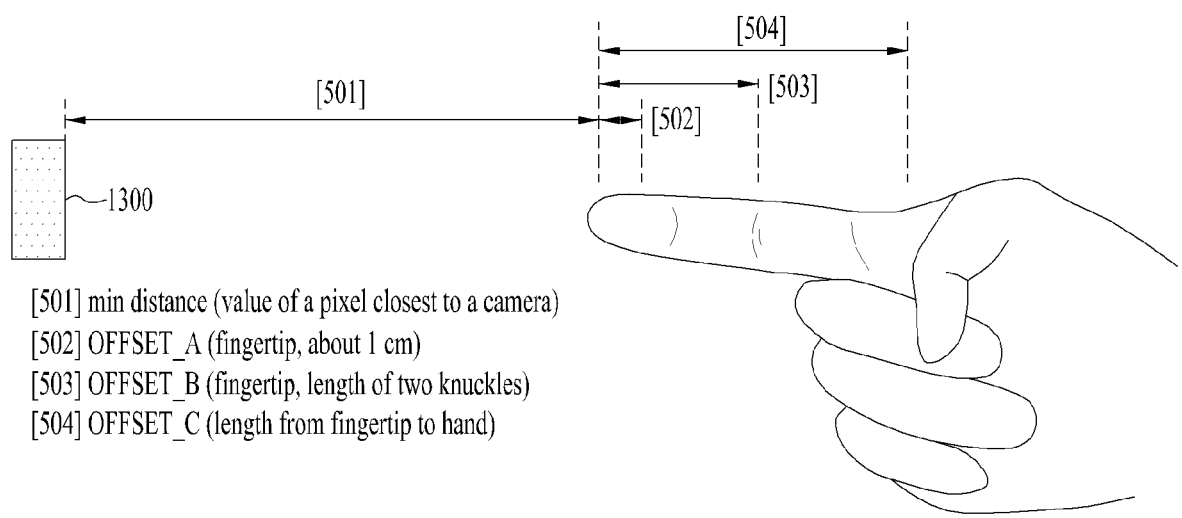
FIG. 13 shows data required for implementing steps S1120 to S1140 shown in FIG. 11.

FIG. 13 shows data required for implementing the steps S1120 to S1140 shown in FIG. 11.

As shown in FIG. 13, a minimum distance means a pixel value of an end point of a finger closest to a camera of a device 1300.

An offset A (OFFSET_A [502]) means a length of a fingertip and normally corresponds to about 1 cm. An offset B (OFFSET_B [503]) means a length of two knuckles from the fingertip and an offset C (OFFSET_C [504]) means a length from the fingertip to a hand. Moreover, at least one of the offsets A to C is variably changed to fit for a user through deep learning, which falls within the scope of the present disclosure.

An image C is found by removing all pixels except a pixel located between the offset B from the minimum distance and the offset C from the minimum distance. In order to find an image C other than a finger region, the finger region is removed through specific processing (e.g., erosion scheme). This will be described in detail with reference to FIG. 25 and FIG. 26. Hence, a region C that is an outer rectangle region of the image C is defined. For reference, the image C corresponds to [601] of FIG. 14 and the region C corresponds to [603] of FIG. 4, which is found experimentally.

Meanwhile, an image B is found by removing all pixels except a pixel located between the minimum distance and the offset B from the minimum distance only. Thereafter, a region B that is an outer rectangle region of the image B is defined. For reference, the image B corresponds to [602] of FIG. 14 and the region B corresponds to [604] of FIG. 4, which is found experimentally.

Figure 16:
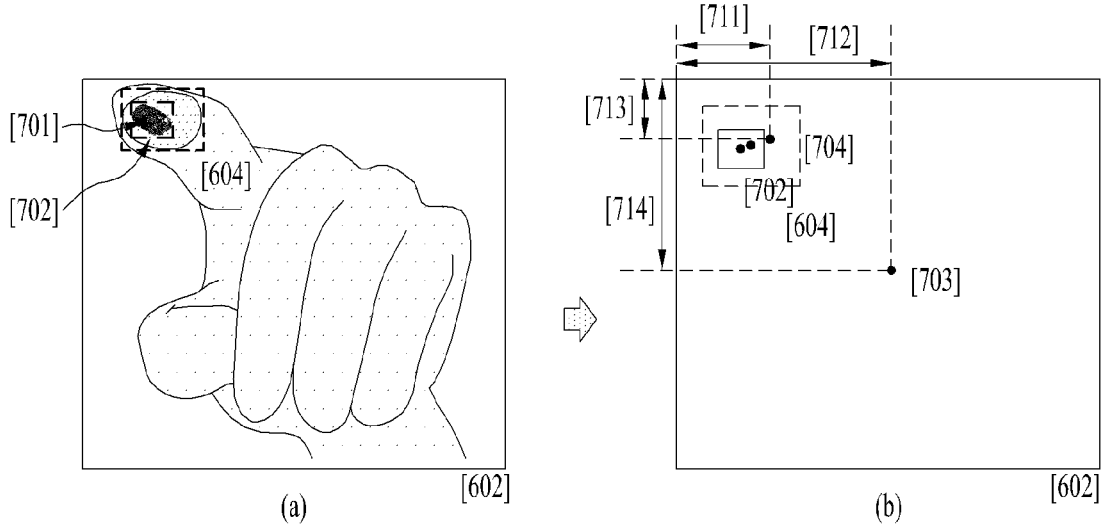
FIG. 16 and FIG. 17 show data required for implementing a step S1080 shown in FIG. 10.

Finally, an image A corresponding to [701] of FIG. 16 is found by removing all pixels except a pixel located between the minimum distance and the offset A from the minimum distance. Thereafter, a region A corresponding to [702] of FIG. 16 that is an outer rectangle region of the image A is defined.

Figure 14:
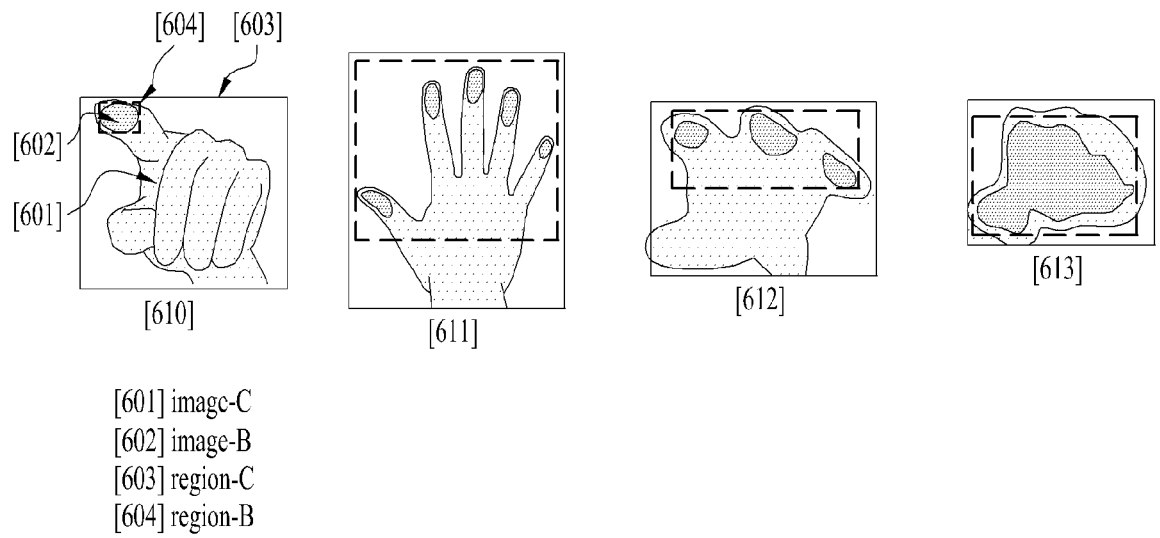
FIG. 14 and FIG. 15 show data required for implementing steps S1150 and S1160 shown in FIG. 11.
Figure 15:
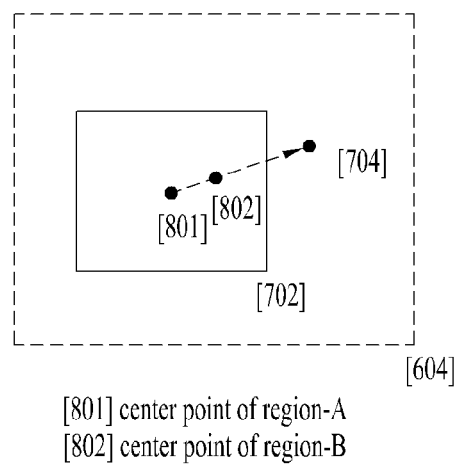

FIG. 14 and FIG. 15 show data required for implementing steps the S1150 and S1160 shown in FIG. 11.

A method of determining whether an acquired shape of a hand is valid data in the present disclosure is to determine whether a segment located within an interaction region is a hand pointing to something.

Firstly, it is determined whether the segment number of the image B (as described above, acquired by removing all pixels except a pixel located between the minimum distance and the offset B from the minimum distance) is 1. As shown in FIG. 14, a multitude of segments are confirmed in [611] and [612], whereas only 1 segment is acquired from [610] or [613]. Since [611] and [612] indicate a gesture of pointing with a finger, they should be excluded.

Secondly, it is determined whether a size of the region B is smaller than 'region C (as described above, the image C corresponding to the region C is acquired by removing all pixels except a pixel located between the minimum distance and the offset C from the minimum distance)*minimum magnification (MIN_RATIO)'. According to such calculation, [610] of FIG. 14 is filtered but the rest of [611], [612] and [613] are automatically excluded because of not corresponding to it. Therefore, as a gesture of pointing with a finger, [610] of FIG. 14 is filtered only.

Thirdly, it is determined whether a distance between a center ([801] of FIG. 15) of the aforementioned region A and a center ([802] of FIG. 15) of the aforementioned region B is smaller than a minimum distance (MIN_DISTANCE).

Of all of the aforementioned three conditions are met, the ready state is maintained. Therefore, as pointing tracking is performed in a state of a gesture of pointing with a finger only, there is a technical effect of minimizing unnecessary tracking. Of course, some of the three conditions are adopted according to the needs of those skilled in the art, which falls within the scope of the present disclosure.

Figure 17:
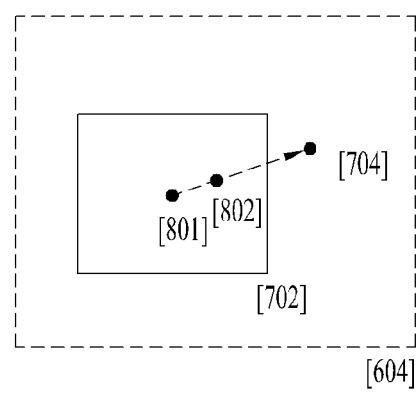

FIG. 16 and FIG. 17 show data required for implementing the step S1080 shown in FIG. 10.

If a pointing direction of a finger is determined with reference to a center point of a hand, it is highly probable that error will occur. Hence, after correction values crx and cry have been derived, it is necessary to change into an active state. This will be described in detail with reference to FIG. 16 and FIG. 17 as follows.

First of all, [703] shown in FIG. 16 (b) indicates a center point of a hand region. Yet, if a direction in which a finger points to a device is determined based on the center point, there is a problem that a state of spreading out a finger should be always maintained. Hence, a technique of acquiring a correction point 704 shown in FIG. 16 (b) is required.

In summary, as shown in FIG. 17, by connecting the center point of the region A and the center point of the region B to each other, the correction point 704 is found. A method of finding the region A and the region B was described in the foregoing description.

First of all, an x-coordinate of the correction point is calculated as follows.

$$cx[704]=(fx[802]-ex[801])*\text{CORRECTION\_RATIO}$$

Meanwhile, a y-coordinate of the correction point is calculated as follows.

$$cy[704]=(fy[802]-ey[801])*\text{CORRECTION\_RATIO}$$

A distance calculated with reference to the x-coordinate of the correction point is represented as follows.

$$dx\_cp[711]=cx[704]-\text{region-}C.\text{left}[603]$$

A distance calculated with reference to an x-coordinate of a hand center point is represented as follows.

$$dx\_hp[712]=hx[703]-\text{region-}C.\text{left}[603]$$

A distance calculated with reference to the y-coordinate of the correction point is represented as follows.

$$dy\_cp[713]=cy[704]-\text{region-}C.\text{top}[603]$$

A distance calculated with reference to the y-coordinate of the hand center point is represented as follows.

$$dy\_hp[714]=hy[703]-\text{region-}C.\text{top}[603]$$

Figure 18:
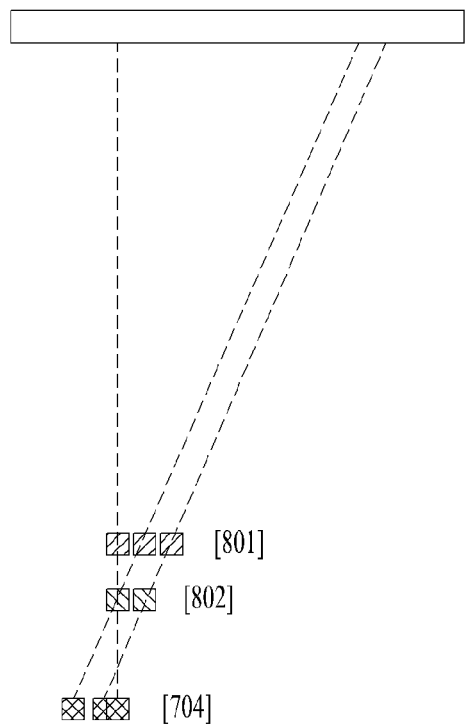
FIG. 18 is a diagram to describe an embodiment of changing a target point in response to a motion of a hand.

Hence, the correction values crx and cry may be found by the following equations.

$$crx=dx\_cp[711]/dx\_hp[712]$$

$$cry=dy\_cp[713]/dy\_hp[714]$$

yet, the above equations are just exemplary, and equations of other types for deriving the result of FIG. 18 fall within the scope of the present disclosure.

Figure 19:
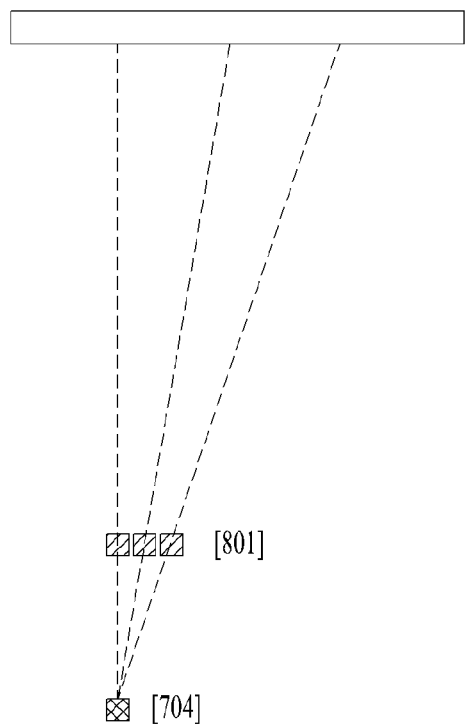
FIG. 19 is a diagram to describe an embodiment of using a fixed target point irrespective of a motion of a hand.

FIG. 18 is a diagram to describe an embodiment of changing a target point in response to a motion of a hand. FIG. 19 is a diagram to describe an embodiment of using a fixed target point irrespective of a motion of a hand.

As described above, the correction point 704 of FIG. 17 may be calculated each time using a center point 801 of a region A and a center point 802 of a region B, which falls within the scope of the present disclosure. Yet, it is also intended to propose a solution for improving this in addition.

FIG. 18 and FIG. 19 are diagrams of a hand viewed in a top direction. For clarity of the description, a real hand shape is removed but informations 801, 802 and 704 acquired through a depth camera are illustrated only. When a finer is moved right and left while a hand remains still, how a target point is changed is illustrated.

FIG. 18 shows a case of deriving a correction point 704 each time using a center point 801 of a region A and a center point 802 of a region B. In this case, an angle is changed greatly by variations of [801] and [802], thereby causing a problem that accuracy is lowered.

FIG. 19 shows a case of deriving the correction point 704 through a region C and a correction ratio. Since a hand remains still, a center point of the region C is identical, whereby the correction point 704 stays at the same position. Accordingly, accuracy is improved greatly.

In brief, after the correction point 704 has been found each time using the center point 801 of the region A and the center point 802 of the region B, if a target point is calculated, since a distance between [801] and [802] is very short, although one of the two is moved by 1 pixel only, a pointing angle is changed greatly. Thus, accuracy of the target point is considerably lowered. Yet, after the correction point 704 has been found using the center point of the region C, if the correction point 704 continues to be used, accuracy is improved.

Figure 20:
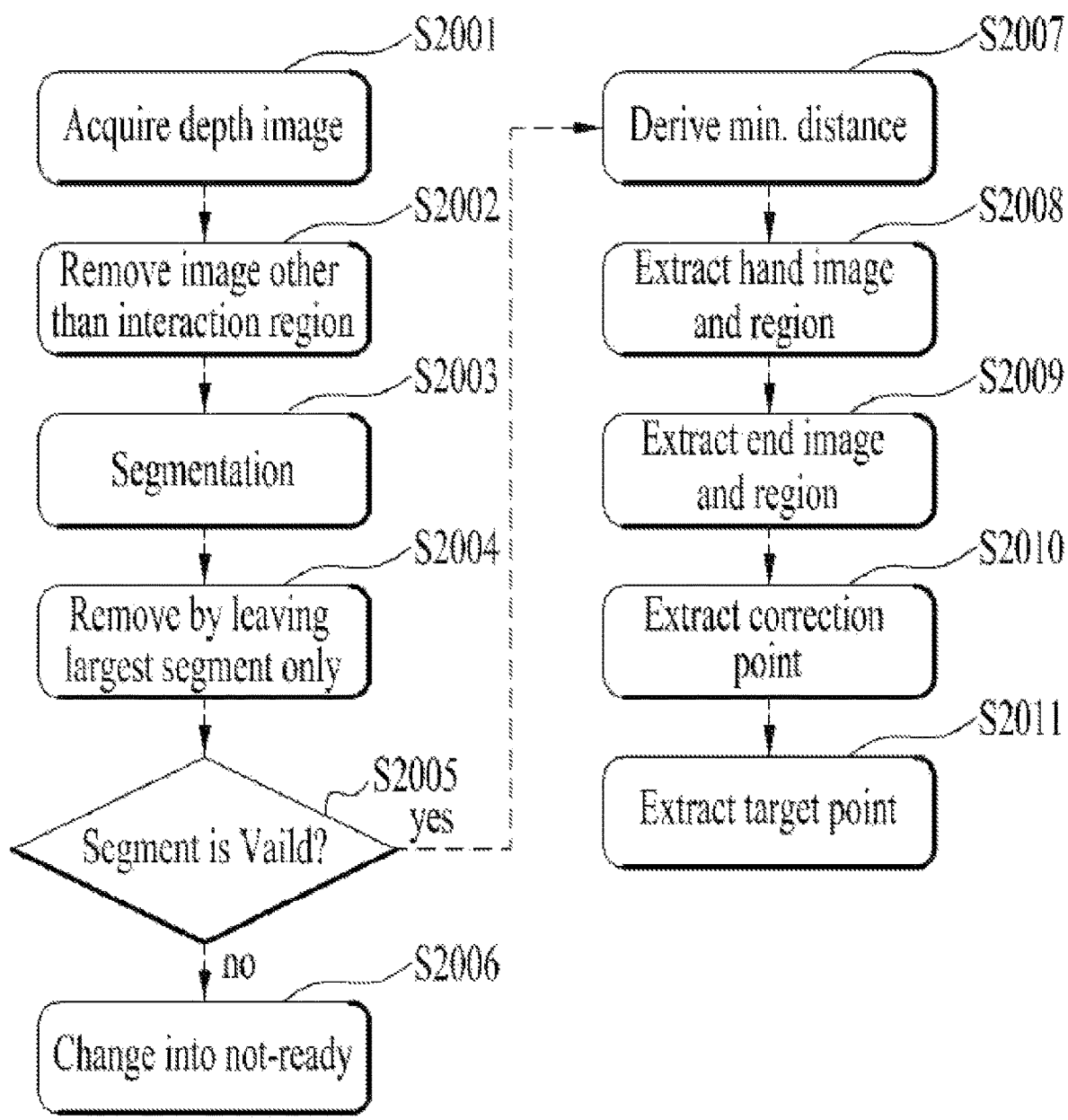
FIG. 20 is a flowchart showing a process for tracking a target point in active state in detail.
Figure 21:
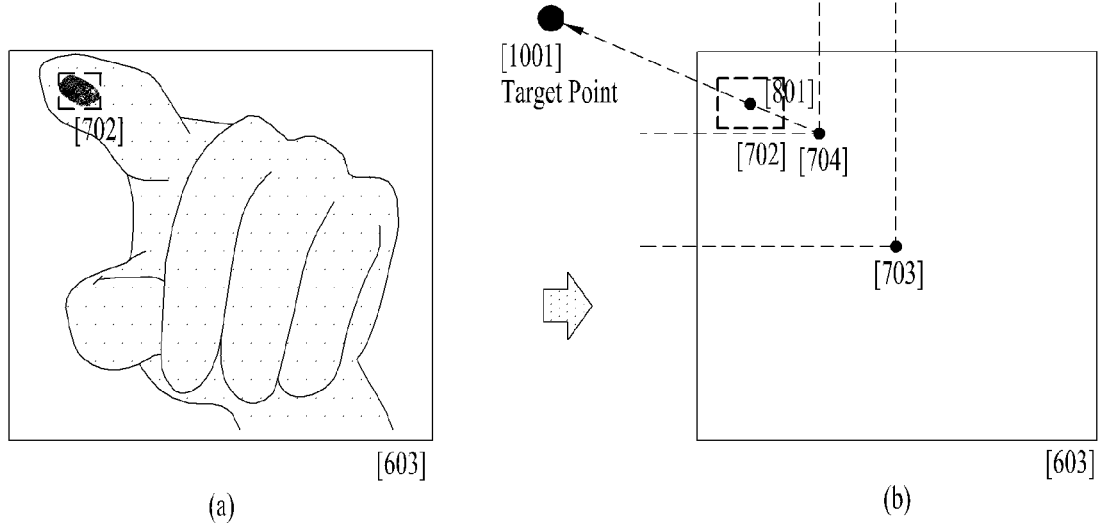
FIG. 21 shows data required for implementing a step S2011 shown in FIG. 20.

FIG. 20 is a flowchart showing a process for tracking a target point in active state in detail. FIG. 21 shows data required for implementing a step S2011 shown in FIG. 20.

As steps S2001 to S2010 shown in FIG. 20 are already described with reference to the previous drawings, a method of implementing a step S2011 shown in FIG. 20 will be described in detail with reference to FIG. 21.

As described above, the correction point (i.e., [704] shown in FIG. 21 (b)) is reconstructed through the correction values crx and cry.

$$cx[704]=\text{region-}C.\text{left}[603]+(hx[703]-\text{region-}C.\text{left}[603])*crx$$

$$cy[704]=\text{region-}C.\text{top}[603]+(hy[703]-\text{region-}C.\text{top}[603])*cry$$

Hence, through the correction point 704 and a ratio between a minimum distance (min_distance) and HAND_OFFSET, a target point 1001 is extracted by the following equations.

$$tx[1001]=ex[801]+(cx[704]-ex[801])*(\text{min\_distance}[501])/\text{offset }C[504])$$

$$ty[1001]=ey[801]+(cy[704]-ey[801])*(\text{min\_distance}[501])/\text{offset }C[504])$$

Figure 22:
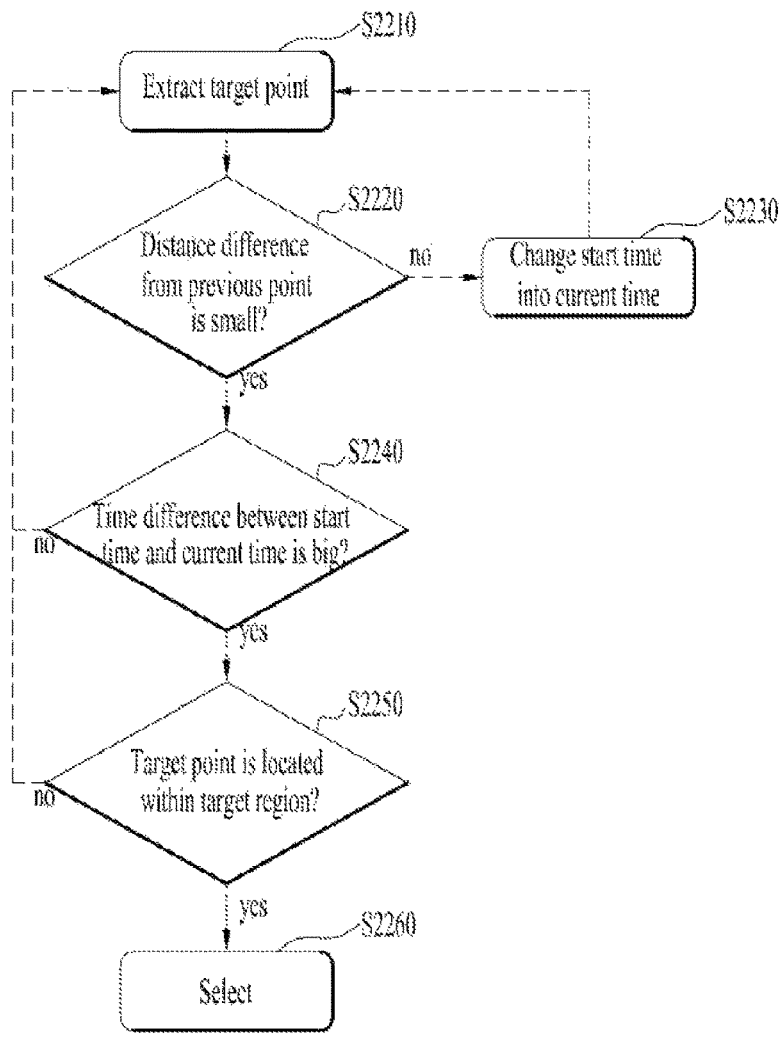
FIG. 22 is a flowchart to describe a process for selecting an object on a display of a device using a target point according to one embodiment of the present disclosure.
Figure 23:
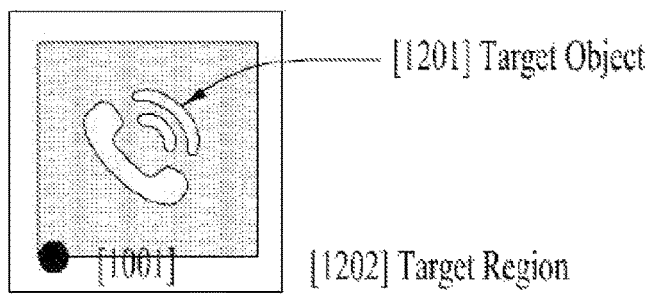
FIG. 23 shows data required for implementing a step S2250 shown in FIG. 22.

FIG. 22 is a flowchart to describe a process for selecting an object on a display of a device using a target point according to one embodiment of the present disclosure. FIG. 23 shows data required for implementing a step S2250 shown in FIG. 22.

As described above, a device according to one embodiment of the present disclosure extracts a target point [S2210].

After a distance between a current point and a previous point has been calculated, it is determined whether a corresponding difference value is smaller than a preset distance reference value (DISTANCE_THRES) [S2220].

As a result of the determination [S2220], if the corresponding difference value is greater, a start time is changed into a current time [S2230]. As a result of the determination [S2220], if the corresponding difference value is smaller, a difference between the current time and the start time is calculated and it is determined whether the corresponding difference value is greater than a preset time reference value (TIME_THRES) [S2240].

As a result of the determination [S2240], if the corresponding difference value is greater, it is determined whether a target point 1001 is located within a target region 1202 [S2250].

As a result of the determination [S2240], if the target point 1001 is located within the target region, it is designed to select or execute a target object 1201 belonging to the target region 1202 [S2260].

Figure 24:
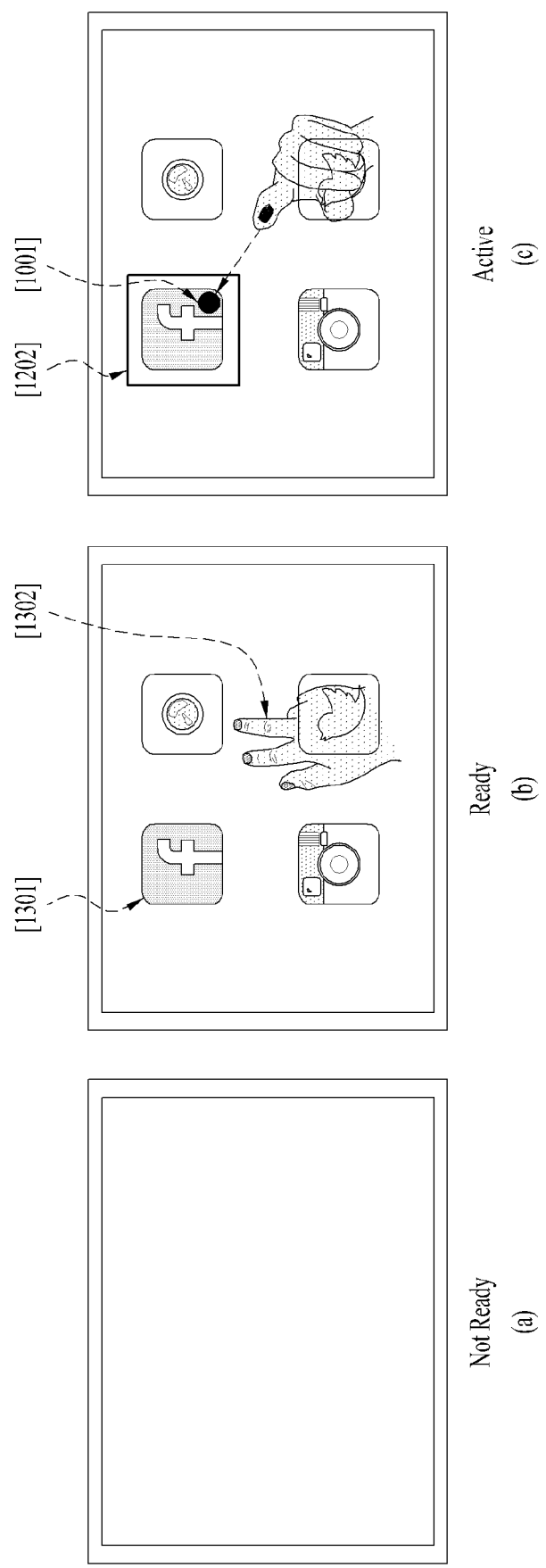
FIG. 24 is a diagram to describe visual feedback per state according to one embodiment of the present disclosure.

FIG. 24 is a diagram to describe visual feedback per state according to one embodiment of the present disclosure.

According to one embodiment of the present disclosure in FIG. 7 and the like a not-ready state, a ready state and an active state are defined. Embodiments that a pointing UI is changed per state are described with reference to FIG. 24.

As shown in FIG. 24 (a), any visual feedback is not provided in a not-ready state. Yet, in a ready state, as shown in FIG. 24 (b), an object 1301 controllable through a pointing UI is displayed. In order that a user can easily check how a hand is recognized in FOV of a depth camera of a device according to one embodiment of the present disclosure, a segment 1302 located within an interaction region is outputted together (e.g., displaying a screen mirrored as if viewing a figure of a hand reflected through a mirror).

Furthermore, when a segment is displayed, resolution of the depth camera is matched to resolution of the display of the device. Namely, a depth image is enlarged/reduced to match the resolution of the display. When the depth image is data-processed (e.g., drawn), a depth value of each pixel is outputted (e.g., drawn) in a manner of being converted into ARGB with a big alpha value if getting closer to a minimum distance (Min_Distance) of an interaction region or ARGB with a small alpha value if getting closer to a maximum distance (Max Distance). Furthermore, when leaving the interaction region, it is set to disappear together with blur processing.

Finally, as shown in FIG. 24 (c), a target point at which a user is pointing is outputted. And, an object region to which the target point belongs is displayed together.

Figure 25:
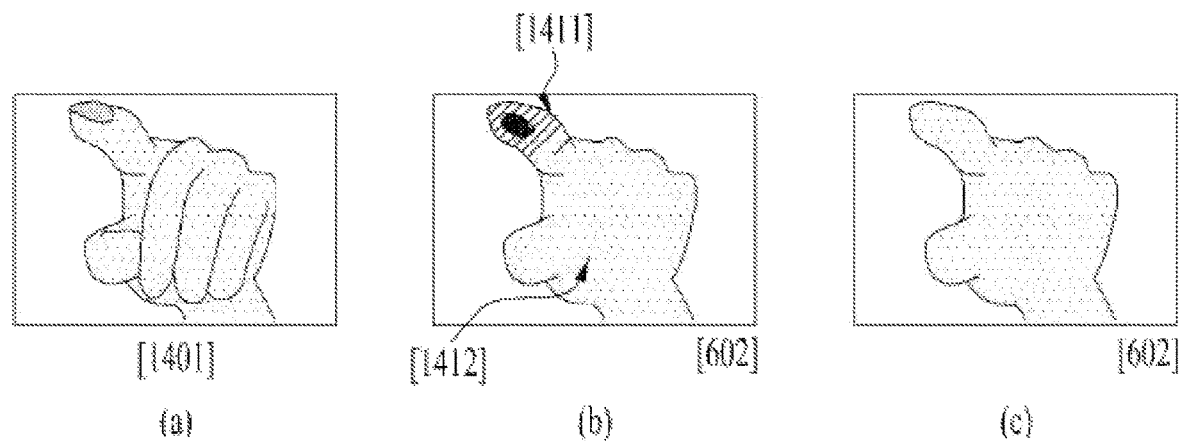
FIG. 25 and FIG. 26 are diagrams showing a process for deleting a region corresponding to a finger in a hand related image acquired by a depth camera.
Figure 26:
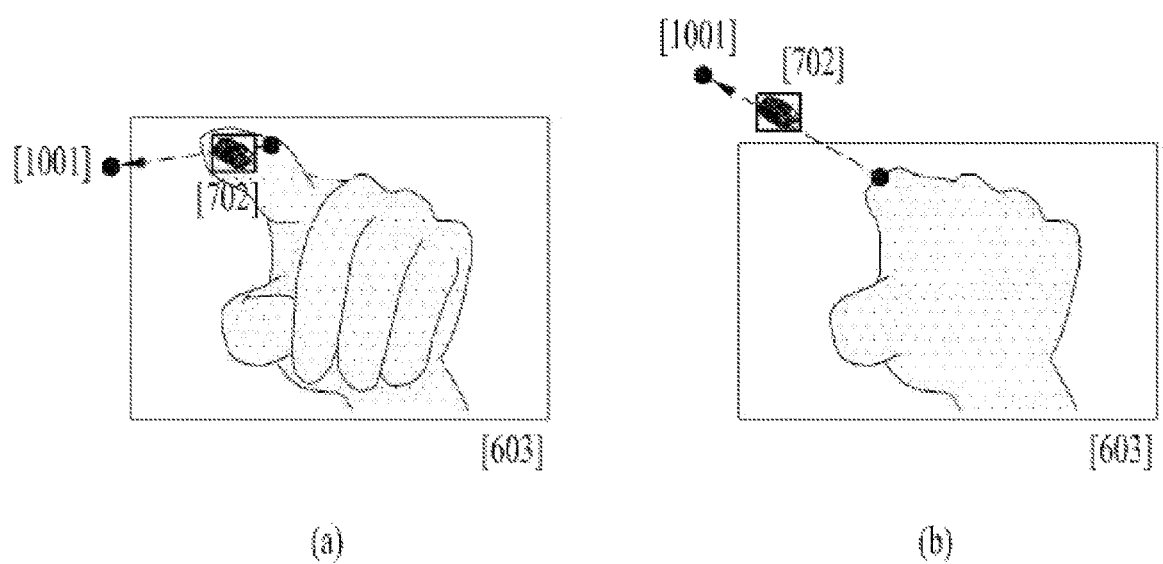

FIG. 25 and FIG. 26 are diagrams showing a process for deleting a region corresponding to a finger in a hand related image acquired by a depth camera.

A hand image ((b) of FIG. 25) can be acquired from an initially acquired original hand segment image (1401 shown in FIG. 25 (a)) through the step 1120 shown in FIG. 11. As shown in FIG. 25 (b), the hand image consists of a finger region 1411 and a hand 1412. Through the hand 1412 resulting from removing the finger region 1411 from the hand image 1401 only, a specific region of the hand (FIG. 25 (c)) is derived, a position of a target point can be found accurately.

An erosion scheme is used to remove the finger region. When a single pixel around is '0' only, the erosion scheme is a filter that changes a corresponding pixel value into 0. Using this filter, as shown in FIG. 25 (c), it is possible to acquire an image from which the finger region is removed.

FIG. 26 (a) shows a result from calculating a position of a target point 1001 after removing a finger region and defining a hand region. On the other hand, FIG. 26 (b) shows a result from calculating a position of the target point 1001 by defining a hand region after removing a finger region. Compared to FIG. 26 (a), an embodiment of FIG. 26 (b) finds a more accurate target point, which could be confirmed experimentally.

FIGS. 27 to 31 are diagrams showing a process for controlling various functions with finger pointing according to one embodiment of the present disclosure.

Figure 27:
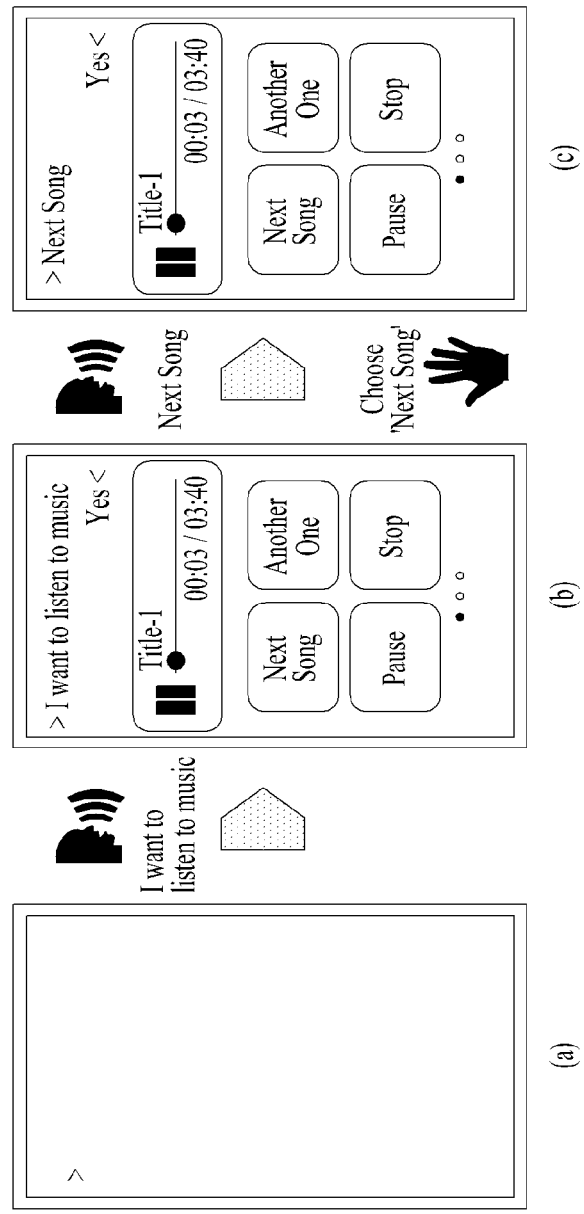
FIGS. 27 to 31 are diagrams showing a process for controlling various functions with finger pointing according to one embodiment of the present disclosure.

FIG. 27 describes a case of applying a pointing UI according to one embodiment of the present disclosure in a process for communicating with an AI for a control command.

Artificial Intelligence (AI) devices may suggest next commands a user can give in advance. For example, if an AI device recognizes a user's voice command (e.g., 'I want to listen to music.') while staying in a not-ready state [FIG. 27 (a)], it displays items (e.g., "Next Song", "Another One", "Pause", "Stop", etc.) estimated as selectable next by a user [FIG. 27 (b)].

In doing so, although the user may speak 'Next Song' as a voice command, as an already executed music sound is recognized as noise, error may occur or voice recognition may be unavailable. To solve such a problem, as shown in FIG. 27 (c), the corresponding command is executed by selecting 'Next Song' through the pointing UI of the present disclosure, which falls within the scope of the present disclosure.

Figure 28:
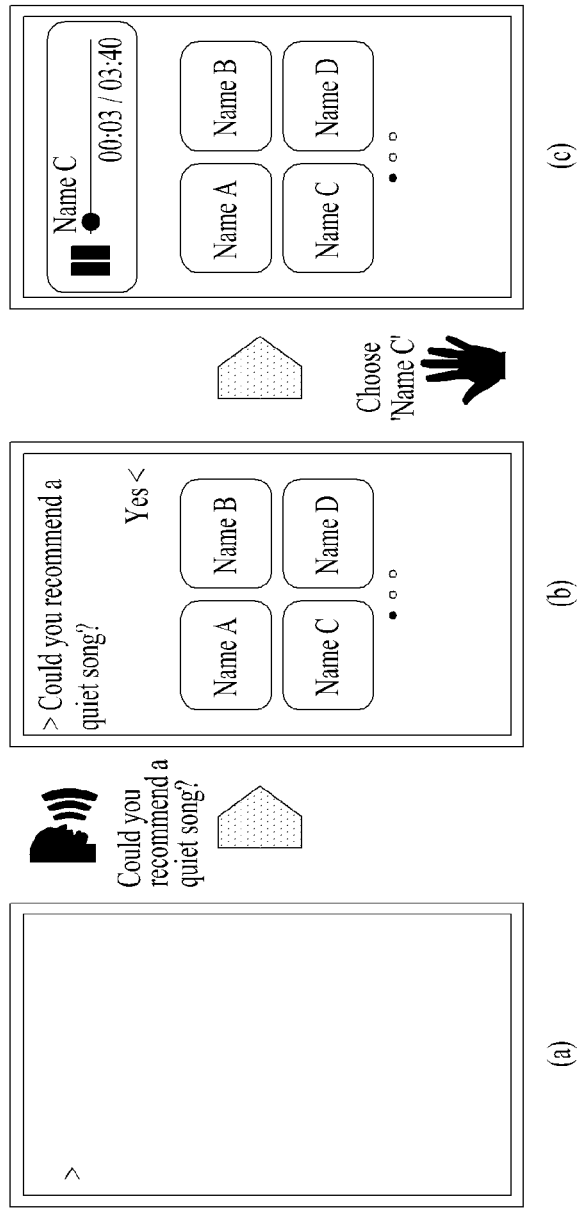

FIG. 28 describes a case of applying a pointing UI according to another embodiment of the present disclosure in a process for communicating with an AI for a control command.

Artificial Intelligence (AI) devices may suggest various replies or options selectable in response to a user's request or query. For example, if an AI device recognizes a user's voice command (e.g., 'Could you recommend a quiet song?') while staying in a not-ready state [FIG. 28 (a)], it displays a list of quiet songs expected to be selectable by a user [FIG. 28 (b)].

In this case, the corresponding command is executed by selecting a song corresponding to 'Name C' through a pointing UI of the present disclosure, which falls within the scope of the present disclosure.

Figure 29:
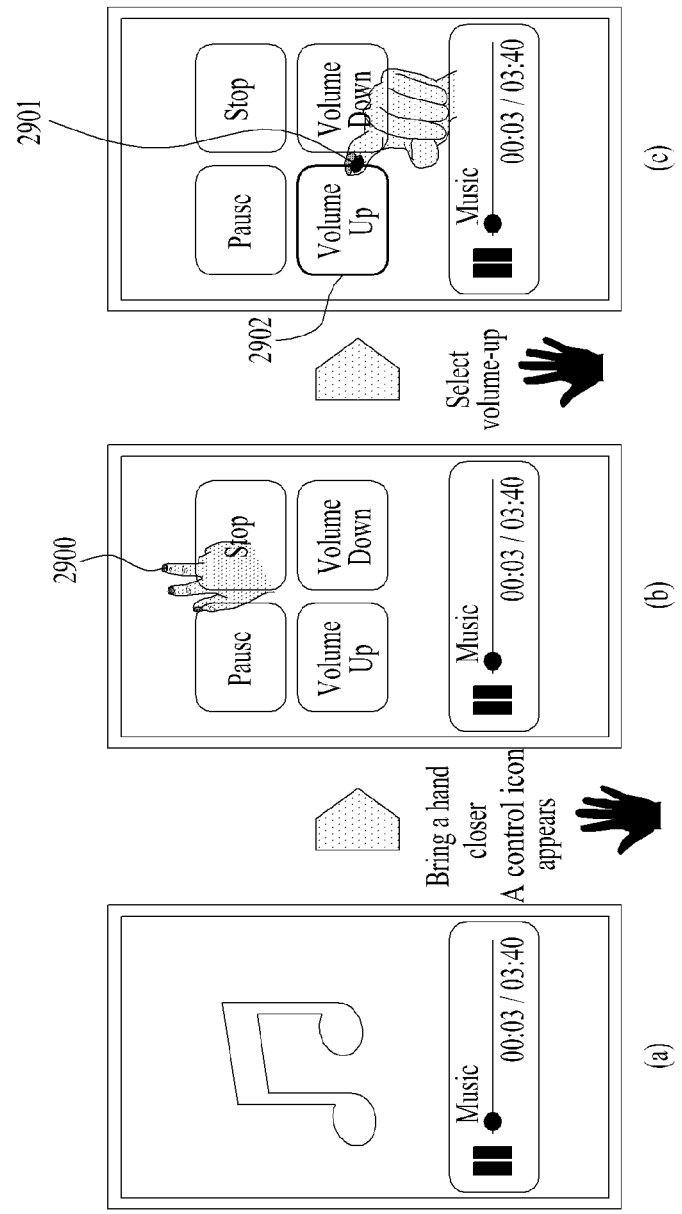

FIG. 29 shows a case of applying a pointing UI according to one embodiment of the present disclosure while an AI device is already outputting audio through a speaker.

For example, while a song is already executed or a search result is outputted in audio data form, if an AI device is controlled through voice, it may cause problems of inconvenience and a low recognition rate.

For example, while a device is outputting a music file, if a user speaks 'OK, LG' toward the audio played device, the device will output the audio 'I am listening.' To the user by turning down a volume and the user may reduce the sound by speaking 'Please reduce the volume'.

Yet, in doing so, there is a problem that it is unable to listen to a song or description while such conversation is in progress. Therefore, while an AI device is outputting audio, if a pointing UI of the present disclosure is used instead of a voice command, all the above problems can be solved.

As shown in FIG. 29 (a), an AI device is reproducing a music file. In doing so, the AI device is in a not-ready state.

Yet, if a user brings a hand closer to the AI device (recognized in an interaction region of the device), as shown in FIG. 29 (b), a control icon 2900 is outputted in form of mirroring. From this time on, tracking on a user hand is performed. Namely, an active state is entered.

Subsequently, as shown in FIG. 29 (c), if a specific option (e.g., volume-up) is selected with a finger pointing 2901, a corresponding function is executed directly.

Figure 30:
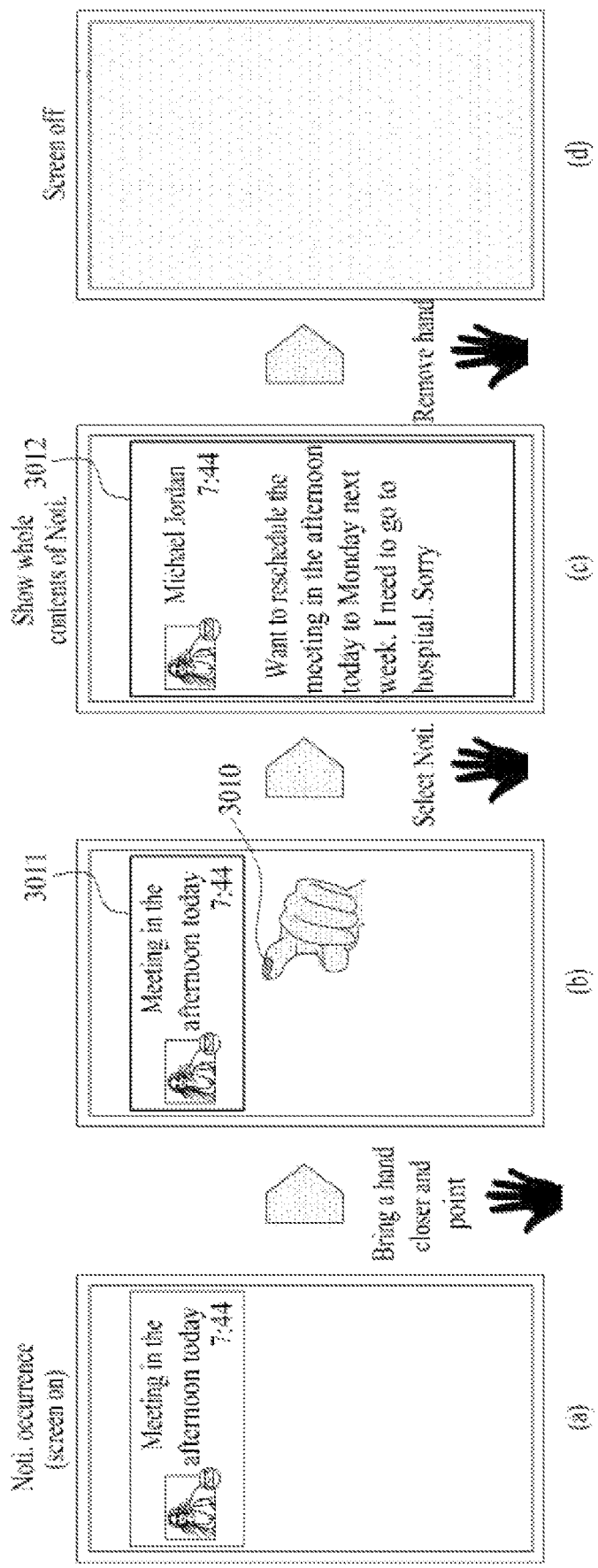

FIG. 30 shows a process for controlling a notification provided by an AI device through a pointing UI according to one embodiment of the present disclosure.

AI devices provide a user with convenient information in various forms. Yet, as described above, it is considerably inconvenient to give a voice command such as 'OK, LG' and the like or a touch with a hand each time. A pointing UI according to one embodiment of the present disclosure can solve such a problem.

As shown in FIG. 30 (a), in case of receiving a notification such as a text or the like, a screen of an AI device or the like is turned on automatically. In doing so, if a pointing 3010 of a finger is recognized as pointing to a specific text 3011, a whole content 3012 of the received text is displayed as shown in FIG. 30 (c). if a hand is not recognized for a predetermined time, as shown in FIG. 30 (d), the screen of the device is automatically turned off, whereby unnecessary battery consumption can be reduced advantageously.

Figure 31:
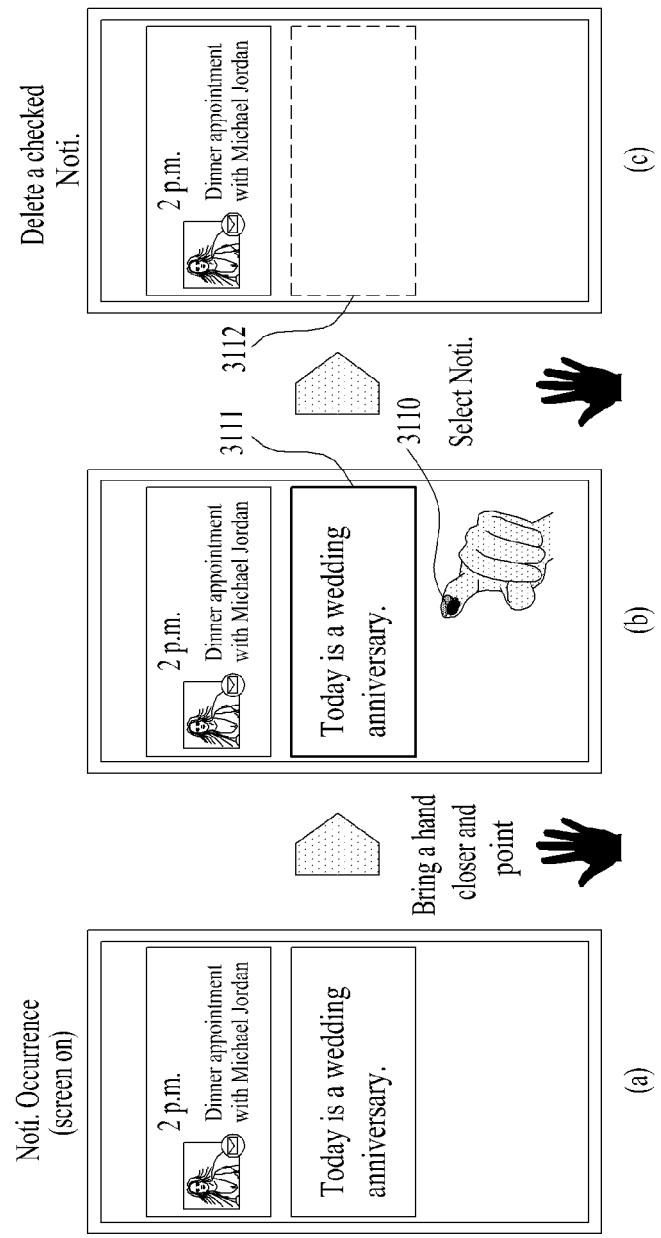

FIG. 31 shows a process for controlling a notification provided by an AI device through a pointing UI according to another embodiment of the present disclosure.

As shown in FIG. 31 (a), in case of receiving a notification such as a text or the like, a screen of an AI device or the like is turned on automatically. In doing so, if a pointing 3110 of a finger is recognized as pointing to a specific text 3111, it is estimated that a user has recognized the received text and a checked text 3112 is not displayed any further as shown in FIG. 31 (c).

The present disclosure mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. The foregoing embodiments are merely exemplary and are not to be considered as limiting the present disclosure. The present teachings can be readily applied to other types of methods and apparatuses. Thus, it is intended that the present disclosure covers the modifications and variations of this disclosure that come within the scope of the appended claims and their equivalents.

MODE FOR DISCLOSURE

Various embodiments for the implementation of the present disclosure are already described in detail in the previous content of BEST MODE FOR DISCLOSURE.

INDUSTRIAL APPLICABILITY

The present disclosure is applicable to a depth camera, a mobile terminal and other digital devices and its industrial applicability is recognized.

What is claimed is:

1. A method of controlling a device including a depth camera, the method comprising:
   acquiring a depth image using the depth camera;
   changing the device from a first state into a second state by analyzing the acquired depth image with reference to a memory;
   determining whether a user's finger points to the device with reference to the memory;
   changing the device from the second state into a third state based on determining that the user's finger points to the device;
   tracking an end point of the user's finger; and
   displaying a target point having a position changeable in response to the tracked end point of the user's finger,
   wherein changing the device from the first state into the second state comprises:
   removing values of pixels failing to exist between a minimum reference distance and a maximum reference distance by comparing pixel values of the depth image;
   among unremoved pixels, estimating pixels having top, bottom, right and left sides attached as a single segment; and
   when a plurality of segments exist, regarding a particular segment having a greatest pixel number as being valid only, and
   when the pixel number of the particular segment is equal to or greater than a preset threshold, changing the device into the second state corresponding to a ready state.

2. The method of claim 1, wherein determining whether the user's finger points to the device comprises estimating a smallest one of pixel values in the particular segment as a pixel value closest to the device.

3. The method of claim 2, wherein determining whether the user's finger points to the device further comprises:
   determining a first image including pixels located from a point estimated as the pixel value closest to the device to a first distance;
   determining a second image including pixels located from the point estimated as the pixel value closest to the device to a second distance; and
   determining a third image including pixels located from the point estimated as the pixel value closest to the device to a third distance,
   wherein the second distance is greater than the first distance, and
   wherein the third distance is greater than the second distance.

4. The method of claim 3, further comprising determining that the user's finger points to the device when a segment number of the second image is 1, a size of the second image is smaller than a predetermined ratio of a size of the third image, and a distance between a center point of the first image and a center point of the second image is smaller than the pixel value closest to the device.

5. The method of claim 1, wherein displaying the target point comprises changing the position of the target point based on a center point of a specific region in the acquired depth image and a fixed correction ratio.

6. The method of claim 1, wherein the depth image captures at least a user's hand, and
   wherein the method further comprises displaying a visual feedback changeable based on the captured user's hand.

7. The method of claim 6, wherein the visual feedback includes a shape mirroring the captured user's hand and distinctively displays an end point of a finger located at a distance closest to the device.

8. The method of claim 6, wherein based on determining that the captured user's hand is located between a minimum reference distance and a maximum reference distance from the device, the visual feedback is displayed.

9. A device comprising:
a depth camera;
a display; and
a controller configured to control the depth camera and the display,
wherein the controller is further configured to:
acquire a depth image using the depth camera;
change the device from a first state into a second state by analyzing the acquired depth image with reference to a memory;
determine whether a user's finger points to the device with reference to the memory;
change the device from the second state into a third state based on determining that the user's finger points to the device;
track an end point of the user's finger; and
display a target point having a position changeable in response to the tracked end point of the user's finger,
wherein the controller is further configured to change the device from the first state into the second state by:
removing values of pixels failing to exist between a minimum reference distance and a maximum reference distance by comparing pixel values of the depth image;
among unremoved pixels, estimating pixels having top, bottom, right and left sides attached as a single segment; and
when a plurality of segments exist, regarding a particular segment having a greatest pixel number as being valid only, and when the pixel number of the particular segment is equal to or greater than a preset threshold, changing the device into the second state corresponding to a ready state.

* * * * *